US012739453B2

(12) United States Patent
Liu et al.

(10) Patent No.: US 12,739,453 B2
(45) **Date of Patent: *Sep. 15, 2026**

(54) DYNAMIC SELECTION OF CANDIDATE BITRATES FOR VIDEO ENCODING

(71) Applicants: Disney Enterprises, Inc., Burbank, CA (US); Beijing YoJaJa Software Technology Development Co., Ltd., Beijing (CN)

(72) Inventors: Chen Liu, Beijing (CN); Wenhao Zhang, Beijing (CN); Scott Labrozzi, Cary, NC (US); Yuanyi Xue, Alameda, CA (US); Xuchang Huangfu, Beijing (CN); Xiaobo Liu, Beijing (CN)

(73) Assignees: Disney Enterprises, Inc., Burbank, CA (US); Beijing YoJaJa Software Technology Development Co., Ltd., Beijing (CN)

( * ) Notice: Subject to any disclaimer, the term of this patent is extended or adjusted under 35 U.S.C. 154(b) by 0 days.

This patent is subject to a terminal disclaimer.

(21) Appl. No.: 18/991,297

(22) Filed: Dec. 20, 2024

(65) Prior Publication Data

US 2025/0126309 A1 Apr. 17, 2025

Related U.S. Application Data

(63) Continuation of application No. 18/179,281, filed on Mar. 6, 2023, now Pat. No. 12,225,252.

(51) Int. Cl.
*H04N 21/238* (2011.01)
*H04N 21/234* (2011.01)
(Continued)

(52) U.S. Cl.
CPC ..... *H04N 21/238* (2013.01); *H04N 21/23418* (2013.01); *H04N 21/2662* (2013.01); *H04N 21/8456* (2013.01)

(58) Field of Classification Search
CPC .......... H04N 21/238; H04N 21/23418; H04N 21/2662; H04N 21/8456; H04N 19/115;
(Continued)

(56) References Cited

U.S. PATENT DOCUMENTS 6,580,754 B1 6/2003 Wan et al.
7,266,149 B2 9/2007 Holcomb et al.
(Continued)

FOREIGN PATENT DOCUMENTS

CN 111277826 A 6/2020
CN 115349263 A 11/2022
(Continued)

OTHER PUBLICATIONS

De Cock Jan et al: “Complexity-based consistent-quality encoding in the cloud”, 2016 IEEE International Conference on Image Processing (ICIP), IEEE, Sep. 25, 2016 (Sep. 25, 2016), pp. 1484-1488, XP033016722, DOI: 10.1109/ICIP.2016.7532605 [retrieved on Aug. 3, 2016].

(Continued)

*Primary Examiner* — Rong Le
(74) *Attorney, Agent, or Firm* — Kwan & Olynick LLP

(57) ABSTRACT

In some embodiments, a method generates a first representation of a first relationship between bitrate and quality based on first features of a first portion of a video. The first representation is analyzed to determine a first list of potential bitrates for the first portion of video. The method analyzes potential bitrates and quality associated with the respective potential bitrates to refine the first list of potential bitrates to a second list of bitrates. The second list of bitrates includes a different list of bitrates than the first list of potential bitrates. The method outputs the second list of bitrates for encoding the first portion of video.

20 Claims, 22 Drawing Sheets

(51) Int. Cl.
*H04N 21/2662* (2011.01)
*H04N 21/845* (2011.01)

(58) Field of Classification Search
CPC ............... H04N 19/146; H04N 19/147; H04N 19/179; H04N 21/23439
See application file for complete search history.

(56) References Cited

U.S. PATENT DOCUMENTS 11,190,826 B1 11/2021 Labrozzi et al.
11,277,620 B1 3/2022 Liu et al.
11,729,438 B1 * 8/2023 Jain .................. H04N 21/26616 725/116
2009/0141992 A1 6/2009 Coulombe et al.
2010/0150459 A1 6/2010 Coulombe et al.
2013/0293725 A1 11/2013 Zhang et al.
2015/0055697 A1 2/2015 Wu et al.
2016/0014418 A1 1/2016 Shao et al.
2016/0021395 A1 1/2016 Sole et al.
2016/0295216 A1 10/2016 Aaron et al.
2017/0046562 A1 2/2017 Juefei-Xu et al.
2017/0359580 A1 12/2017 Su et al.
2018/0041779 A1 2/2018 Zhang et al.
2018/0124146 A1 * 5/2018 Chen .................... H04N 21/258
2019/0020871 A1 1/2019 Xu et al.
2019/0204892 A1 7/2019 Wu et al.
2019/0297329 A1 9/2019 Bampis et al.
2020/0296362 A1 9/2020 Chadwick et al.
2021/0150393 A1 5/2021 Johansson et al.
2021/0360260 A1 11/2021 Rehman et al.
2022/0030247 A1 1/2022 Olekas et al.
2022/0046305 A1 * 2/2022 Labrozzi ............ H04N 21/2662
2023/0104270 A1 4/2023 Wang et al.
2023/0188764 A1 * 6/2023 Pahalawatta ......... H04N 19/179 725/116
2024/0107027 A1 3/2024 Yamagishi et al.
2024/0119575 A1 4/2024 Bampis et al.
2024/0121400 A1 4/2024 Menon et al.
2024/0305842 A1 9/2024 Liu et al.

FOREIGN PATENT DOCUMENTS

CN 118612443 A 9/2024
EP 4429235 A1 9/2024
EP 4429236 A1 9/2024
JP 2018513604 A 5/2018
JP 2022008071 A 1/2022
JP 2022185534 A1 12/2022
JP 2023524000 A 6/2023
JP 2024125995 A 9/2024
WO 2016160295 A1 10/2016
WO 2021113181 A1 6/2021
WO 2021236059 A1 11/2021
WO 2022185534 A1 9/2022

OTHER PUBLICATIONS

Extended European Search Report for Application No. 24156318.8, dated Jun. 14, 2024, 11 pgs.

Extended European Search Report for European Application No. 24156321.2, dated Jul. 22, 2024, 11 pgs.

Foreign Offie Action, JP Patent Application No. 2023-199277, mailed Dec. 3, 2024.

Liu, et al, "Dynamic Selection of Candidate Bitrates for Video Encoding," U.S. Appl. No. 18/179,281, filed Mar. 6, 2023, 59 pages.

Liu, et al, "Encoding Operational Points Selection for Video Encoding," U.S. Appl. No. 18/435,842, filed Feb. 7, 2024, 71 pages.

Liu, et al, "Prediction of Rate Distortion Curves for Video Encoding," U.S. Appl. No. 18/295,184, filed Apr. 3, 2023, 83 pages.

Somdyuti Paul et al: "Efficient Per-Shot, Convex Hull Prediction By Recurrent Learning", arxiv.org, Cornell University Library, 201 Olin Library Cornell University Ithaca, NY 14853, Jun. 10, 2022 (Jun. 10, 2022}, XP091244097, 11 pgs.

Zabrovskiy Anatoliy et al: "FAUST" Fast Per-Scene Encoding Using Entropy-Based Scene Detection and Machine Learning:, 2021 30th Conference of Open Innovations Associateion Fruct, Fruct, Oct. 27, 2021 (Oct. 27, 2021), pp. 292-302, XP034024326, DOI: 10.23919/FRUCT53335.2021.9599963 [retrieved on Nov. 2, 2021].

Zhengfang Duanmu et al: "Modeling Generalized Rate-Distortion Functions", arxiv.org, Cornell University Library, 201 Olin Library Cornell University Ithaca, NY 14853, Jun. 12, 2019 (Jun. 12, 2019}, XP081376508, 17 pgs.

Decision of Rejection, Japanese Patent Application No. 2023-199277, mailed May 20, 2025, 7 pages.

Office Action, Japanese Patent Application No. 2023-199246, mailed Jan. 21, 2025, 5 pages.

Extended European Search Report, EP Application No. 24217423.3, Feb. 20, 2025, 8 pages.

Pre-Appeal Examination Report, Japanese Patent Application No. 2023-199277, mailed Dec. 16, 2025, 2 pages.

Examination Report (Art. 94(3) EPC), EP Application No. 24217423.3, Feb. 12, 2026, 8 pages.

Office Action, Korea Patent Application No. 10-2023-0162762, Ministry of Intellectual Property (MOIP), mailed Mar. 17, 2026, 12 pages.

Office Action, Korean Patent Application No. 10-2023-0162761, The Ministry of Intellectual Property, mailed Mar. 16, 2026, 8 pages.

First Office Action, Japanese Patent Application No. 2025-084633, Apr. 7, 2026, 2 pages.

Examination Report (Art. 94(3) EPC) for Application No. 24156318.8, dated Jun. 17, 2026, 6 pgs.

Examination Report (Art. 94(3) EPC) for Application No. 24156321.2, dated Jun. 19, 2026, 13 pgs.

First Examination Report, India Patent Office (IPO), India Application: 202344076801, mailed May 29, 2026, 7 pages.

* cited by examiner

DYNAMIC SELECTION OF CANDIDATE BITRATES FOR VIDEO ENCODING

CROSS REFERENCE TO RELATED APPLICATIONS

This application is a continuation application and, pursuant to 35 U.S.C. § 120, is entitled to and claims the benefit of earlier filed application U.S. application Ser. No. 18/179,281, filed Mar. 6, 2023, entitled "DYNAMIC SELECTION OF CANDIDATE BITRATES FOR VIDEO ENCODING", the content of which is incorporated herein by reference in its entirety for all purposes.

BACKGROUND

One method of delivering videos to client devices uses Adaptive Bitrate Streaming (ABR). Adaptive bitrate streaming is predicated on providing multiple streams (often referred to as variants or profiles) that are encoded at different levels of video attributes, such as different levels of bitrate and/or quality. A profile ladder lists different profiles that are available for a client to use when streaming segments of a video. Clients can dynamically select profiles based on network conditions and other factors. The video is segmented (e.g., split into discrete segments, usually a few seconds long each), and clients can switch from one profile to another at segment boundaries as network conditions change. For example, a video delivery system would like to provide clients with a profile that has a higher bitrate when network conditions with higher available bandwidth are being experienced, which improves the quality of the video being streamed. When network conditions with lower available bandwidth are being experienced, the video delivery system would like to provide clients with a profile with a lower bitrate such that the clients can play the video without any playback issues, such as rebuffering or downloading failures.

BRIEF DESCRIPTION OF THE DRAWINGS

The included drawings are for illustrative purposes and serve only to provide examples of possible structures and operations for the disclosed inventive systems, apparatus, methods and computer program products. These drawings in no way limit any changes in form and detail that may be made by one skilled in the art without departing from the spirit and scope of the disclosed implementations.

DETAILED DESCRIPTION

Figure 1:
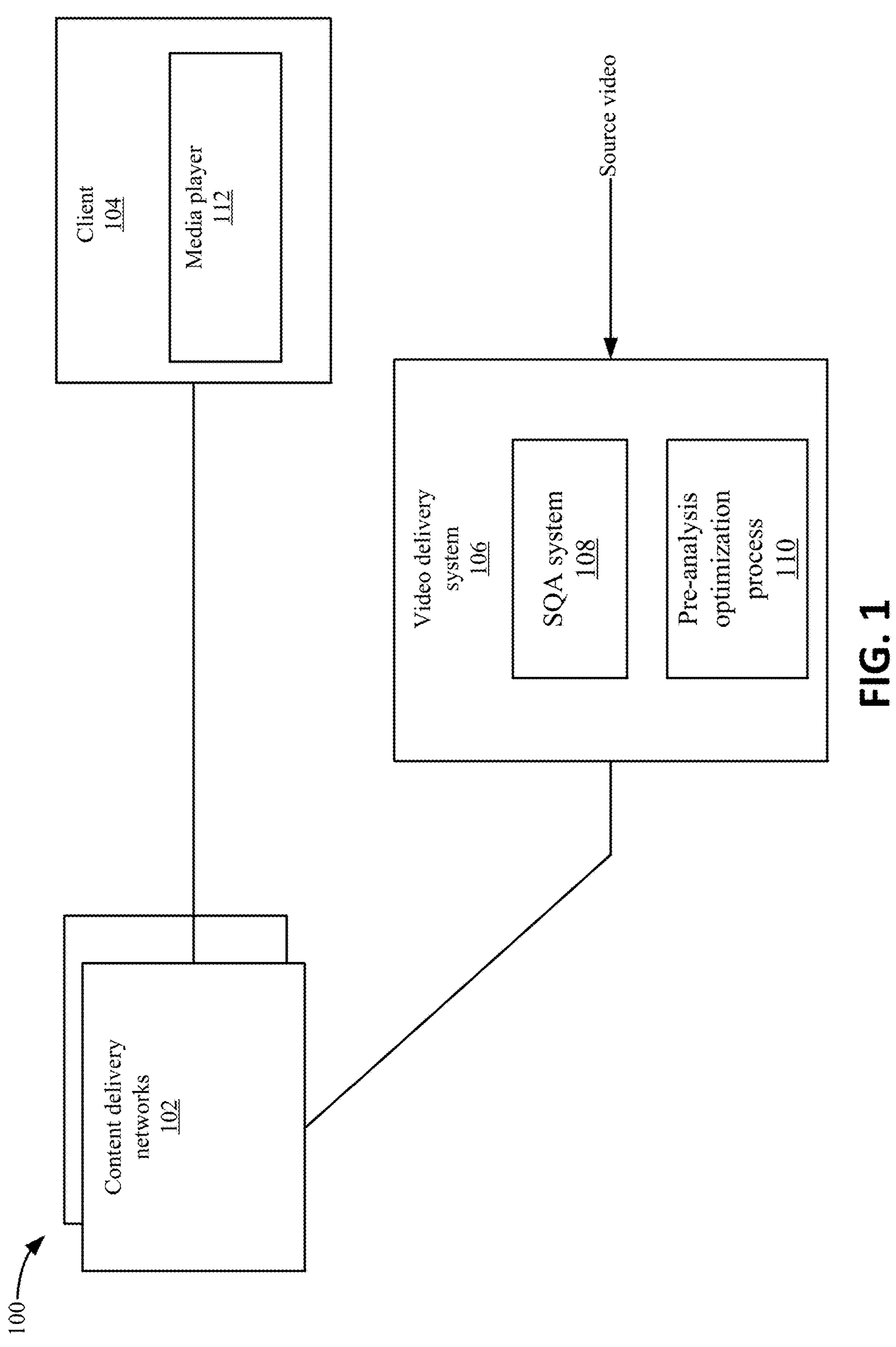
FIG. 1 depicts a system for dynamically selecting a list of candidate average bitrates according to some embodiments.

Described herein are techniques for a video delivery system. In the following description, for purposes of explanation, numerous examples and specific details are set forth to provide a thorough understanding of some embodiments. Some embodiments as defined by the claims may include some or all the features in these examples alone or in combination with other features described below, and may further include modifications and equivalents of the features and concepts described herein.

A system may adaptively generate a list of bitrates that is used for encoding a video. The list of bitrates may be referred to as candidate average bitrates (CABs). An encoder transcodes segments of the video using the respective bitrates in the list of candidate average bitrates. In some embodiments, the system may dynamically select a list of candidate average bitrates for different portions of the video, such as for different chunks of the video. A chunk may be an independent encoding unit that an encoder encodes with the same settings. A video may include one or more chunks, and each chunk may include multiple segments. In some embodiments, the list of candidate average bitrates may be set at the chunk level. Although the list of candidate average bitrates is discussed as being set at the chunk level, the list of candidate average bitrates may be set for different portions of the video.

The encoder may encode segments of the video using the bitrates in the list of candidate average bitrates to generate multiple candidate segments. A segment quality-driven adaptive (SQA) process may select segments from the candidate segments to use for profiles in a profile ladder. A target of the process is to optimize (e.g., minimize) the storage or delivery footprint of portions of the video while maintaining a similar quality.

Each video may have different characteristics. Similarly, different portions within the same video may also have different characteristics. Using a static list of candidate average bitrates for all the portions of a video or for multiple videos may not provide optimal results. For example, a static list of candidate average bitrates may encode a video with simple video content with more bitrate than is needed. Also, a video with complex video content may be encoded with poor quality due to insufficient bitrate. Additionally, the static list of candidate average bitrates may generate segments with irregular quality gaps from an encoding perspective. For example, adjacent profiles may have similar video quality that are redundant to each other or may have unacceptable large quality gaps. Having similar video quality for adjacent profiles may be unnecessary and not provide many advantages in viewing quality. For example, if two bitrates in the list of candidate average bitrates result in encoded segments that have similar qualities, then transcoding the segment with those two bitrates may be redundant, and may waste resources. Also, having a large quality gap may result in an adverse viewing experience during playback as the quality may change drastically when playback switches from one profile to another profile.

To overcome the above disadvantages, a pre-analysis optimization process may dynamically select bitrates in the list of candidate average bitrates for a video. To select the list of candidate average bitrates, the pre-analysis optimization process may analyze a portion of video and output an optimized list of candidate average bitrates for that portion. For example, the pre-analysis optimization process may analyze characteristics of each portion and output a list of candidate average bitrates for each portion. In some embodiments, the pre-analysis optimization process may predict characteristics of the portion, such as a rate-distortion curve that describes the quality versus the bitrate for the portion. The pre-analysis optimization process uses the respective rate distortion curve to determine the optimal list of bitrates for each portion.

The optimization process provides many advantages. For example, the process provides an optimal selection of transcoded segments to select from when selecting segments for profiles in the profile ladder. If the list of candidate average bitrates is set with static values for the entire video and/or is the same for multiple different videos, suboptimal transcoding may result. Different videos and also different portions of the same video may have diverse characteristics. Therefore, a static list of candidate average bitrates may be suboptimal for some videos or portions of a video. The use of a dynamic list of candidate average bitrates that is based on characteristics of portions of video may result in a higher quality video and viewing experience because the segment quality-driven adaptive process may have a better selection of encoded segments to select from to form the profiles for the profile ladder.

System

FIG. 1 depicts a system 100 for dynamically selecting a list of candidate average bitrates according to some embodiments. System 100 includes content delivery networks 102, clients 104, and a video delivery system 106. Source files may include different types of content, such as video, audio, or other types of content information. Video may be used for discussion purposes, but other types of content may be appreciated. In some embodiments, a source file may be received in a format that requires encoding to another format, which will be discussed below. For example, the source file may be a mezzanine file that includes compressed video. The mezzanine file may be encoded to create other files, such as different profiles of the video.

A content provider may operate video delivery system 106 to provide a content delivery service that allows entities to request and receive media content. The content provider may use video delivery system 106 to coordinate the distribution of media content to a client 104. Although a single client 104 is discussed, multiple clients 104 may be using the service. The media content may be different types of content, such as on-demand videos from a library of videos and live videos. In some embodiments, live videos may be where a video is available based on the linear schedule. Videos may also be offered on-demand. On-demand videos may be content that can be requested at any time and not limited to viewing on a linear schedule. The videos may be programs, such as movies, shows, advertisements, etc.

Client 104 may include different computing devices, such as smartphones, living room devices, televisions, set top boxes, tablet devices, etc. Client 104 includes a media player 112 that can play content, such as a video. In some embodiments, media player 112 receives segments of video and can play these segments. Client 104 may send requests for segments to one of content delivery networks 102, and then receive the requested segments for playback in media player 112. The segments may be a portion of the video, such as six seconds of the video.

A video may be encoded in a profile ladder that includes multiple profiles. Each profile may correspond to different configurations, which may be different levels of bitrates and/or quality, but may also include other characteristics, such as codec type, computing resource type (e.g., computer processing unit), etc. Each video may have associated profiles that have different configurations. The profiles may be classified at different levels and each level may be associated with a different configuration. For example, a level may be combination of bitrate, resolution, codec, etc. For example, each level may be associated with a different bitrate, such as 400 kilobytes per second (kbps), 650 kbps, 1000 kbps, 1500 kbps, . . . 12000 kbps. Also, each level may be associated with another characteristic, such as a quality characteristic (e.g., resolution). The profile levels may be referred to as higher or lower, such as profiles that have higher bitrates or quality may be rated higher than profiles with lower bitrates or quality. An encoder may use the characteristics to encode the source video. For example, the encoder may encode the source video with a target bitrate of 1500 kbps.

Content delivery networks 102 include servers that can deliver a video to client 104. Content delivery networks 102 receive requests for segments of video from client 104, and delivers segments of video to client 104. Client 104 may request a segment of video from one of the profile levels based on current playback conditions. The playback conditions may be any conditions that are experienced based on the playback of a video, such as available bandwidth, buffer length, etc. For example, client 104 may use an adaptive bitrate algorithm to select the profile for the video based on the current available bandwidth, buffer length, or other playback conditions. Client 104 may continuously evaluate the current playback conditions and switch among the profiles during playback of segments of the video. For example, during the playback, media player 112 may request different profiles of the video asset. For example, if low bandwidth playback conditions are being experienced, then media player 112 may request a lower profile that is associated with a lower bitrate for an upcoming segment of the video. However, if playback conditions of a higher available bandwidth are being experienced, media player 112 may request a higher-level profile that is associated with a higher bandwidth for an upcoming segment of the video.

A segment quality driven adaptive processing system (SQA system) 108 may encode segments using a list of candidate average bitrates. Then, SQA system 108 selects segments for each profile using an optimization process. For example, SQA system 108 may adaptively select a segment with an optimal bitrate for each profile of the profile ladder while maintaining similar quality levels. SQA system 108 allows the system to maintain similar or matching quality to the target bitrate while minimizing the number of bits required to store or deliver the content.

A pre-analysis optimization process 110 may dynamically generate a list of candidate average bitrates for portions of a video. In some embodiments, pre-analysis optimization process 110 may predict respective characteristics of a portion of video, such as a rate distortion curve. Then, pre-analysis optimization process 110 selects candidate average bitrates for the portion based on analyzing the respective characteristics of the portion of video.

The following will now describe the segment quality driven adaptive processing process and then the dynamic selection of the list of candidate average bitrates in more detail.

Segment Quality Driven Adaptive Process

Figures 2, 3A:
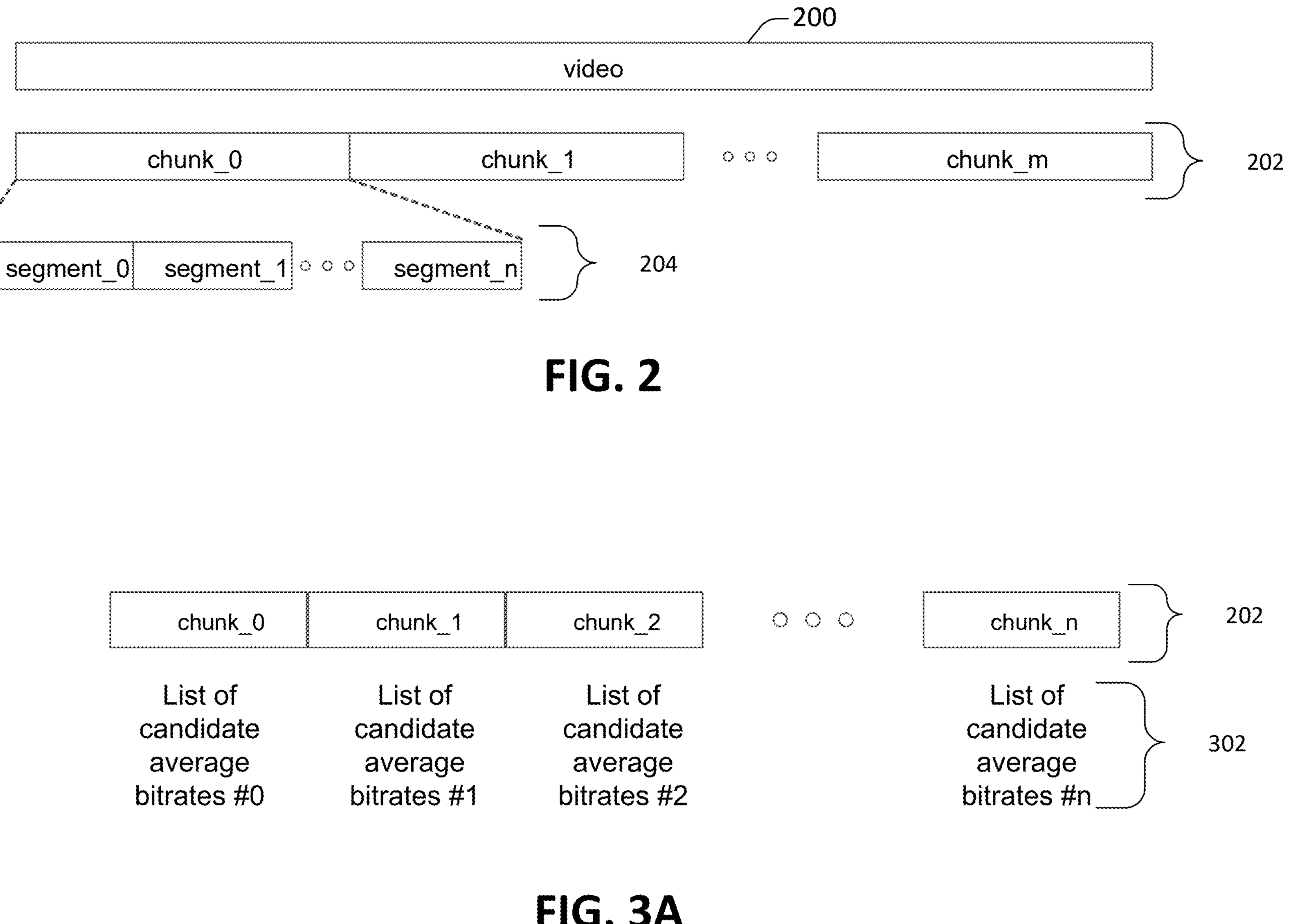
FIG. 2 shows an example of portions of a video according to some embodiments.
FIG. 3A depicts an example of the generation of lists of candidate average bitrates according to some embodiments.

As discussed above, optimization process 110 may dynamically select a list of candidate average bitrates for portions of a video. The portion of video may be different sizes. FIG. 2 shows an example of portions of a video according to some embodiments. A video 200 may be divided into different portions at a segment level and a chunk level. In some embodiments, at 202, video 200 may be divided into chunk level portions. For example, multiple chunks of chunk_0, chunk_1, . . . , chunk_m may be included in video 200. Each respective chunk may be divided into smaller portions, which may be referred to as segments. For example, at 204, chunk_0 is divided into segments of segment_0, segment_1, . . . , segment_n. Similarly, although not shown, chunk_1 may be divided into its own respective segments of segment_0, segment_1, . . . , segment_n. The segments may be shorter in length than the chunks. For example, a chunk may be two minutes of video and a segment may be five seconds of video.

In the segment quality driven adaptive process, SQA system 108 may process each segment of video 200 to generate multiple encodings of each respective segment based on a list of candidate average bitrates. For discussion purposes, optimization process 110 selects a list of candidate average bitrates per chunk; however, the list of candidate average bitrates may be selected for different portion sizes, such as per segment, for multiple chunks, etc. The bitrates included in each respective list of candidate average bitrates may be optimized based on characteristics associated with the respective portion of video that will use the list of candidate average bitrates (e.g., a chunk and/or segments). Given different characteristics for different chunks, respective lists of candidate average bitrates may be different. However, it may be possible that bitrates for multiple chunks in respective lists of candidate average bitrates are the same.

FIG. 3A depicts an example of the generation of lists of candidate average bitrates according to some embodiments. At 202, chunks are shown of chunk_0, chunk_1, chunk_2, . . . , chunk_n. At 302, optimization system 110 has selected a list of candidate average bitrates for each chunk based on characteristics of each respective chunk. For example, for chunk_0, a list of candidate average bitrates #0 is based on the characteristics for chunk_0. Also, a list of candidate average bitrates #1 is based on the characteristics for chunk_1, and so on. In some examples, for chunk_0, the list of candidate average bitrates #0 may include the bitrates of 8500, 7750, 7000, 6250, 5500, 4750, 4000, 3250 Kilobytes per second (Kbps). For chunk_1, the list of candidate average bitrates #1 may include the bitrates of 7000, 6250, 4750, 4000, 3250, 2000, 1250 Kbps.

The list of candidate average bitrates may include bitrates that are used by an encoder to encode a respective segment. Conventionally, the candidate average bitrates may have statically included the same bitrates. Sometimes, two types of bitrates were used for all chunks. A first type may be a target average bitrate and a second type may be an intermediate average bitrate. The target average bitrate may be a basic bitrate that is associated with profiles in a profile ladder for adaptive bitrate encoding. An intermediate average bitrate may be a supplement to the target average bitrate. For example, additional bitrates in between target average bitrates may be added. The use of intermediate average bitrates may provide additional bitrates to encode additional encoded segments that may have different characteristics than the encoded segments from the target average bitrates, such as quality. In some cases, optimization process 110 may include bitrates from the target average bitrate and/or the intermediate average bitrates in the list of candidate average bitrates. For example, optimization process 110 may include the target average bitrates in the list of candidate average bitrates, but dynamically select other bitrates. In other examples, optimization process may dynamically select the bitrates in the list of candidate average bitrates based solely on the characteristics of the chunk.

Figure 3B:
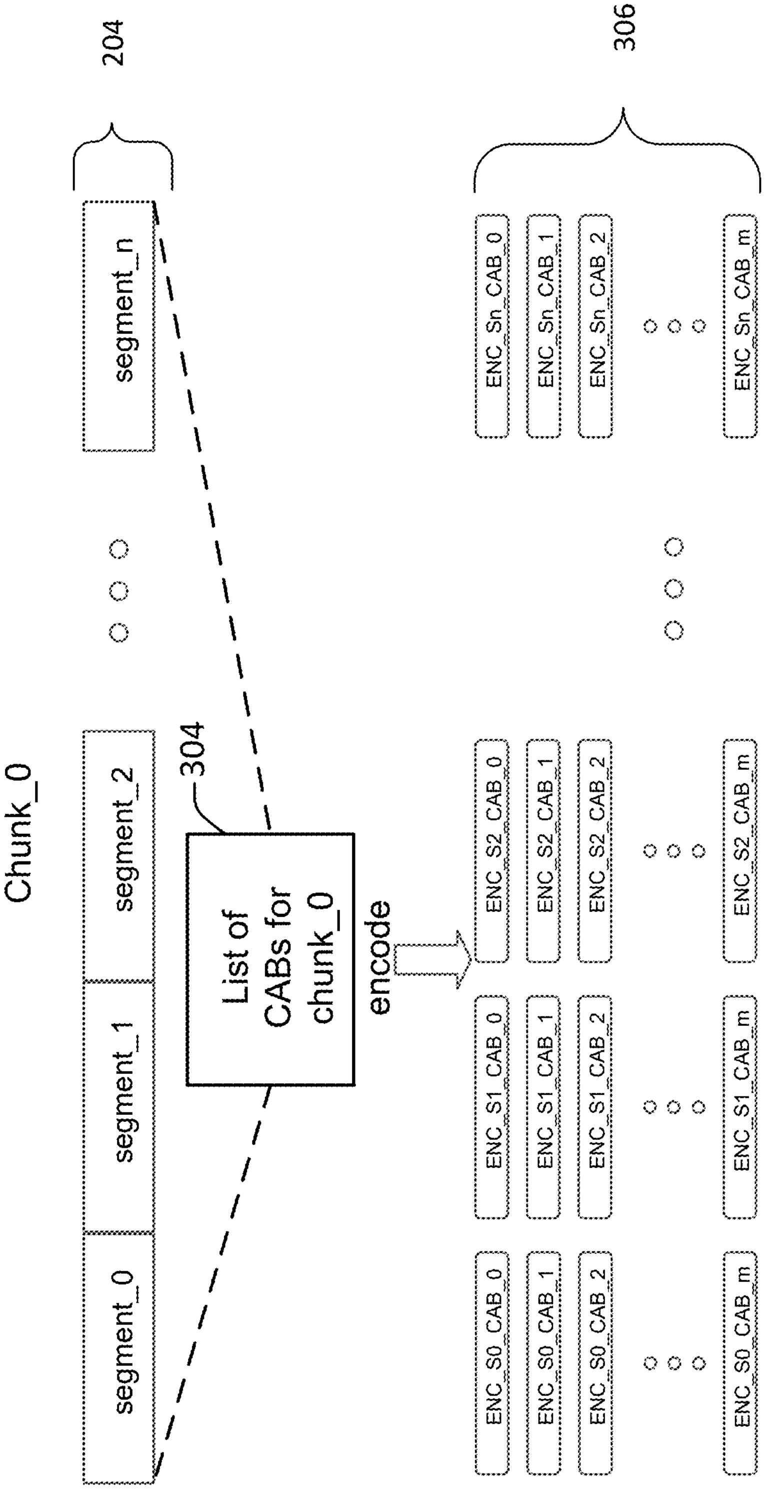
FIG. 3B depicts an example of the generation of encoded segments according to some embodiments.

As discussed above, an encoder generates encoded segments for a chunk. FIG. 3B depicts an example of the generation of encoded segments according to some embodiments. At 204, segments for a chunk of chunk_0 are shown of segment_0, segment_1, segment_2, . . . , segment_n. At 304, a list of candidate average bitrates (list of CABs) for chunk_0 is used. In some embodiments, the same list of candidate average bitrates for chunk_0 is used for all segments of the chunk. However, multiple different lists of candidate average bitrates could be used for different segments of the chunk. Then, an encoder encodes the segments of chunk_0 using the list of candidate average bitrates.

At 306, encoded segments for each respective segment are listed. For a respective segment, an encoder encodes the segment using the average bitrates in the list of candidate average bitrates. The encoder may target the respective average bitrate when encoding the segment. This results in a set of encoded segments for each segment of the chunk, such as encoded segments for segment_0 of ENC_S0_CAB_0, ENC_S0_CAB_1, ENC_S0_CAB_2, . . . , ENC_S0_CAB_n. In the notation, ENC_S0 represents the encoded segment of segment_0, and CAB_0, CAB_1, CAB_2, etc. represents the candidate average bitrates. For example, CAB_0 may be 8500 Kbps, CAB_1 may be 7750 Kbps, and CAB_2 may be 7000 Kbps. Each encoded segment may be encoded at the same quality level, such as 1080p. The process may be repeated for another quality level using the list of candidate average bitrates.

Figure 4:
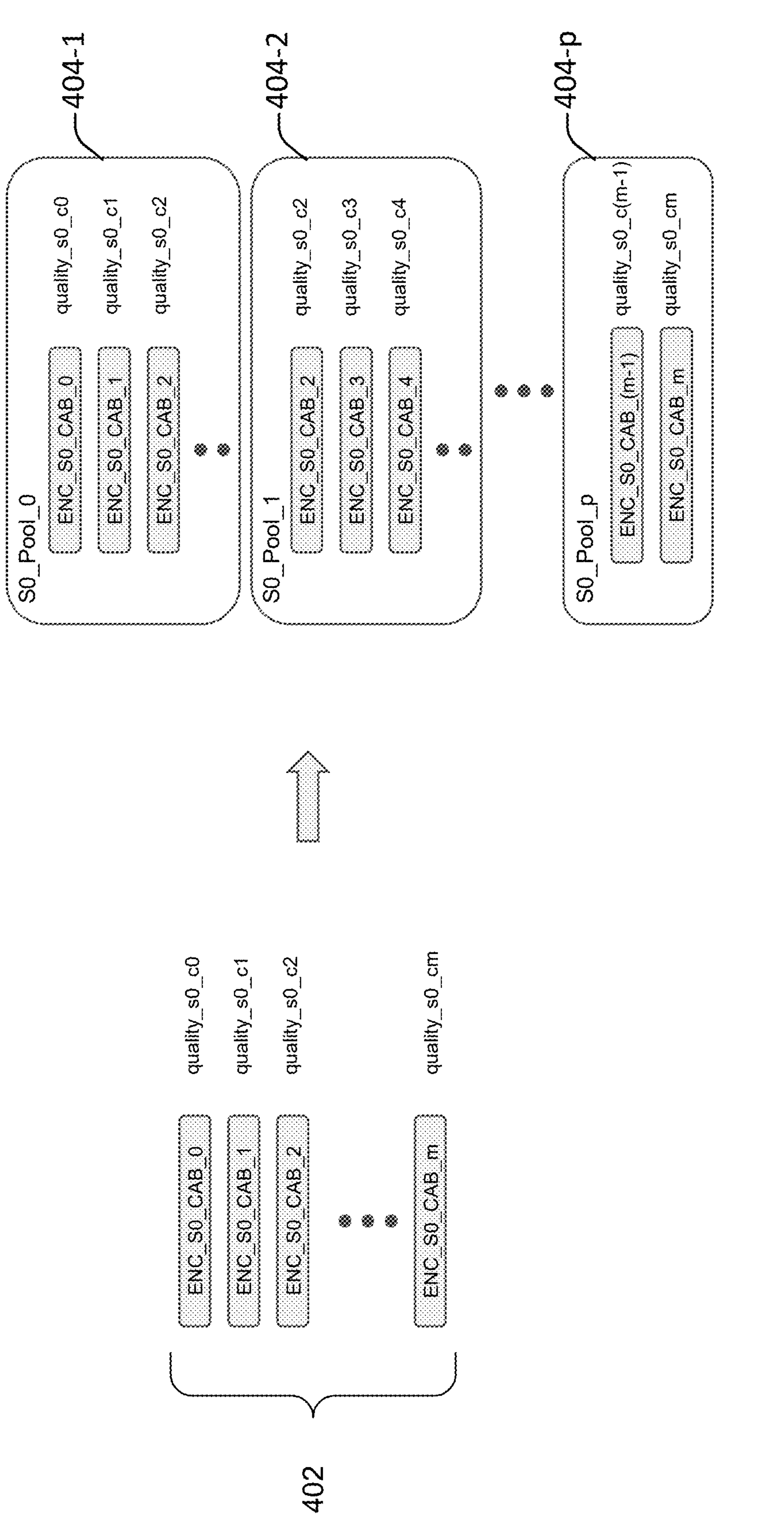
FIG. 4 depicts an example of clustering encoded segments into multiple pools according to some embodiments.

For each segment, optimization process 110 clusters the encoded segments into multiple pools. Each pool may correspond to one profile. FIG. 4 depicts an example of clustering encoded segments into multiple pools according to some embodiments. At 402, multiple encoded segments are shown for the candidate average bitrates. Each segment may have an associated value for a quality metric. For example, encoded segment ENC_S0_CAB_0 may have a quality of quality_S0_c0 and encoded segment ENC_S0_CAB_1 may have a quality of quality_S0_c1, etc. In the notation, quality_S0 represents the encoded segment of segment_0, and c0, c1, c2, etc. represents the quality for this encoded segment.

Different methods may be used to include encoded segments in pools 401-1, 404-2. 404-*p*. For example, each pool may have or may be associated with a profile. A respective profile may be associated with a target bitrate, which may be the maximum bitrate that can be used to encode a segment in the associated profile. SQA system 108 may include encoded segments starting with the highest average bitrate that can be used for the associated profile for the pool. Then, SQA system 108 may add other encoded segments at other bitrates that are less than the maximum bitrate. This may result in different encoded segments that are included in respective pools. For example, pool S0_Pool_0 may include segments ENC_S0_CAB_0, ENC_S0_CAB_1, ENC_S0_CAB_2, etc. Also, pool S0_Pool_1 may include encoded segments ENC_S0_CAB_2, ENC_S0_CAB_3, ENC_S0_CAB_4, etc. Accordingly, pool S0_Pool_1 may include an encoded segment starting at a bitrate that is less than the maximum bitrate in pool S0_pool_0. If the encoded segments are encoded at the bitrates of 8500, 7750, 7000, 6250, 5500, 4750, 4000, 3250 Kbps, pool S0_pool_0 may start with the encoded segments at the average bitrates of 8500, 7750, 7000, etc., and pool S0_pool_1 may start with the encoded segments at the average bitrates of 7000, 6250, 5500, etc. In some examples, the example bitrates for the pools may be pool_0: 8500, 7700, 7000, 6250, 5500, 4750, pool_1: 7000, 6250, 5500, 4750, 4000, and pool_p: 5500, 4750, 4000, 3250.

Figure 5:
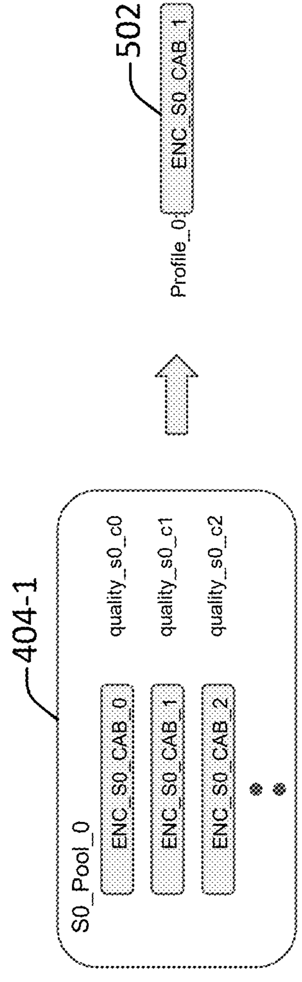
FIG. 5 depicts an example of the selection process according to some embodiments.

From each pool, SQA system 108 may select one encoded segment based on using a selection process. FIG. 5 depicts an example of the selection process according to some embodiments. The following process may be performed for each pool. At 404-1, pool S0_pool_0 from FIG. 4 is shown with its respective encoded segments. SQA system 108 may use one or more rules to select an encoded segment for each respective pool. At 502, SQA system 108 selects encoded segment ENC_S0_CAB_1 for pool S0_pool_0. In some embodiments, SQA system 108 may attempt to select an encoded segment with a minimum bitrate that has a quality value that meets a criterion. In some examples, SQA system 108 may start from the first encoded segment in the pool, such as the segment with the highest bitrate. Then, SQA system 108 selects an adjacent encoded segment in the pool, such as the encoded segment with the next highest bitrate. If the first encoded segment and the second encoded segment have a similar quality (e.g., within a threshold), SQA system 108 selects the encoded segment with the lowest bitrate. SQA system 108 may continue the comparison using the second encoded segment and an adjacent encoded segment in the pool, such as a third encoded segment. The process may end when an adjacent encoded segment does not have a similar quality. Other methods may also be used, such as starting from the encoded segment with the lowest bitrate. Also, the process may select a segment with a lowest bitrate that has a quality within a threshold of another segment, such as a segment with the highest bitrate. The following will describe an example of the process using a rate distortion curve.

Figure 6:
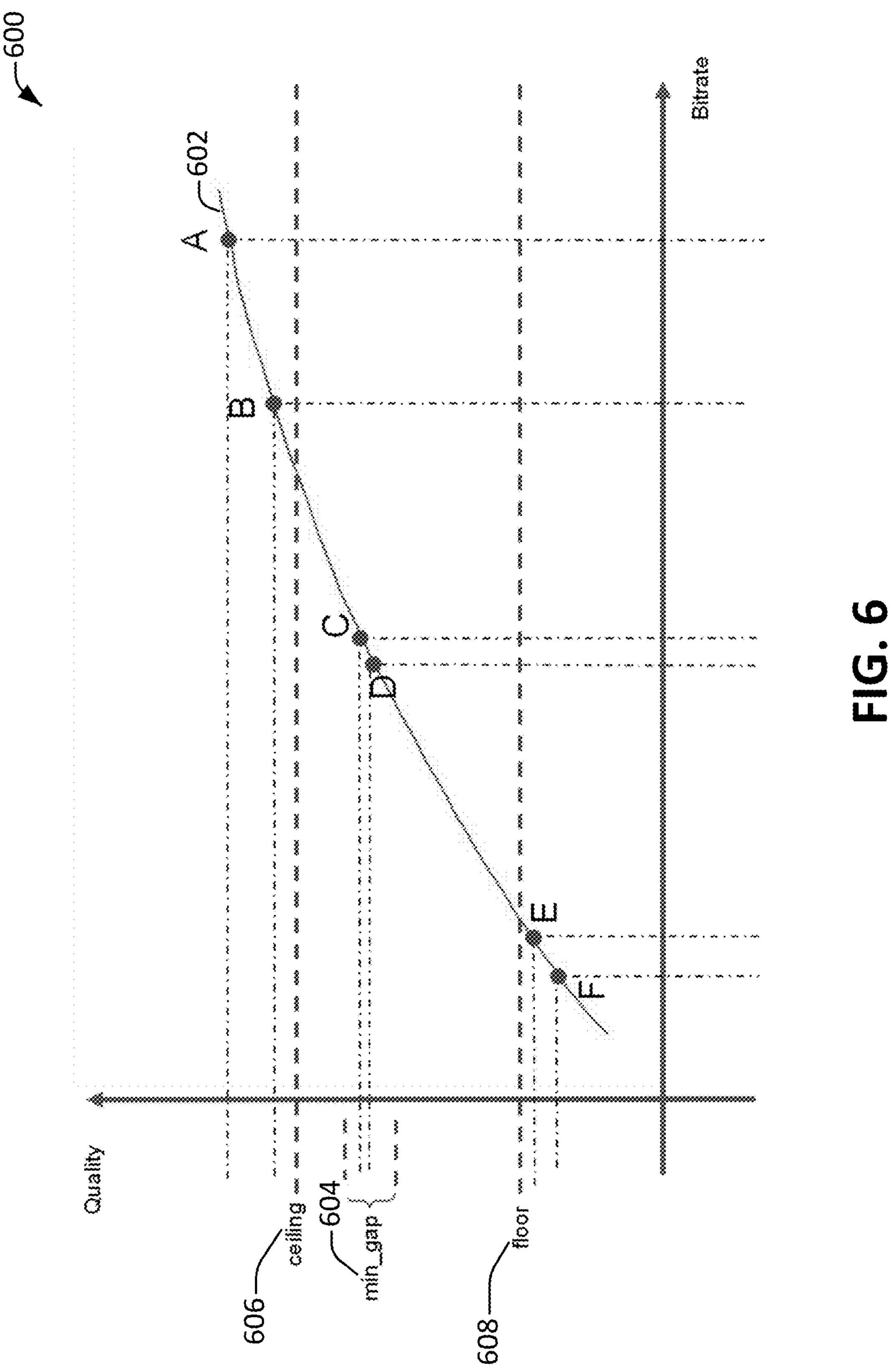
FIG. 6 depicts an example of a graph of a rate distortion curve that may be used to select encoded segments for pools according to some embodiments.

FIG. 6 depicts an example of a graph 600 of a rate distortion curve that may be used to select encoded segments for pools according to some embodiments. In graph 600, the Y-axis is quality and the X-axis is bitrate. A curve 602 defines the relationship between quality and bitrate. For example, the curve may plot rate and distortion of the segment or chunk, but the curve may plot other characteristics of quality and bitrate.

The encoded segments may be listed as A, B, C, D, E, F on the curve 602 based on the respective rate and distortion of the encoded segments. At 604, an example of encoded segments that have similar quality is shown. In this case, encoded segment C and encoded segment D have similar bitrates and similar quality. For example, the quality difference between encoded segment C and encoded segment D may meet a threshold min_gap (e.g., be equal to and/or less than). In this case, since the quality difference is minimal, SQA system 108 may select encoded segment D because this encoded segment has a lower bitrate compared to encoded segment C, but segment D offers a similar quality compared to segment C.

SQA system 108 may also collapse encoded segments whose quality are beyond the ceiling boundary. For example, a ceiling boundary at 606 may be a boundary that is used to determine encoded segments as candidates to collapse. In this case, SQA system 108 may select one or more of the segments above the ceiling threshold, such selecting only one segment (e.g., segment B), or selecting less of the segments found above the ceiling threshold (e.g., selecting two of four segments). In other examples, encoded segments A and B may be removed. Also, SQA system 108 may remove encoded segments whose quality is below a floor boundary. For example, at 608, a floor threshold is shown. SQA system 108 may select one or more of the segments below the floor threshold, such selecting only one segment (e.g., segment F), or selecting less of the segments found below the floor threshold. In other examples, encoded segments E and F may be removed. The ceiling threshold and the floor threshold may be used to limit the segments for a profile that exceed a desired bitrate or quality, or are lower than a desired bitrate or quality. One reason a ceiling is used is to limit the bitrate that is used to encode a segment and one reason a floor is used is to limit bitrates that are used that are too low. After processing of the encoded segments to remove encoded segments, SQA system 108 may select a segment for the profile. For example, SQA system 108 may select the encoded segment with the lowest bitrate that has a quality level that meets a threshold, such as withing a gap to the highest quality segment. In this case, SQA system 108 may select encoded segment D.

Although the above rules may be used to select segments, other processes may be used. For example, the selection of an encoded segment may be based on which encoded segments have been selected for other profiles. In some examples, the segment that is selected may be based on reducing the storage of encoded segments where profiles may reuse segments from other profiles. Accordingly, SQA system 108 may optimize the quality and minimize the bitrate used for encoded segments that are found in between the floor and ceiling.

Figure 7:
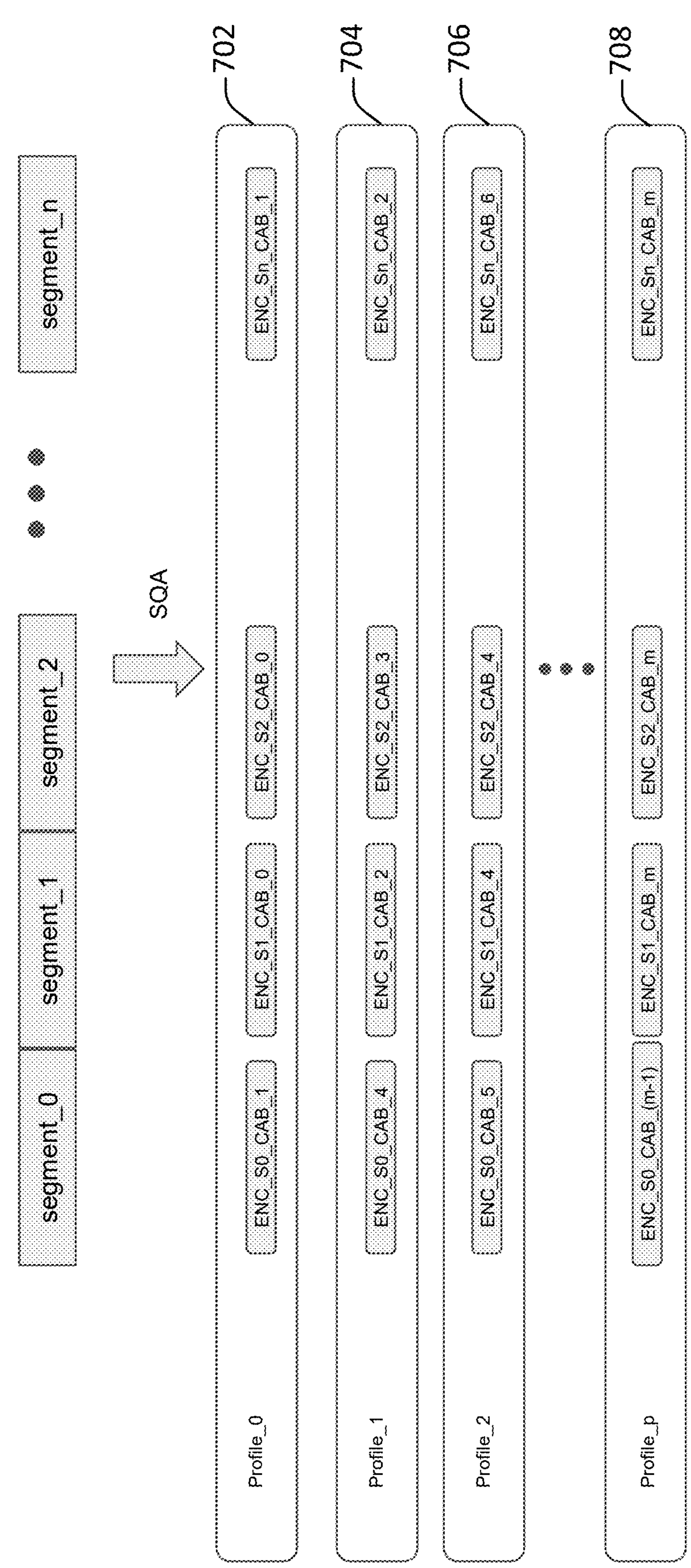
FIG. 7 depicts an example of the selected encoded segments for profiles for each segment according to some embodiments.

FIG. 7 depicts an example of the selected encoded segments for profiles for each segment according to some embodiments. At 702, 704, 706, and 708, the encoded segments are shown for Profile_0, Profile_1, Profile_2 and Profile_P, respectively. Within a profile, SQA system 108 may select different encoded segments with different candidate average bitrates for different segments. For example, for profile_0, segment_0 was encoded using candidate average bitrate CAB_1, segment_1 was encoded using candidate average bitrate CAB_0, segment_2 was encoded using candidate average bitrate CAB_0, etc. In some examples, in profile_0, segment_0 was encoded using the bitrate 7750 Kbps, segment_1 was encoded using the bitrate 8500 and segment_2 was encoded using the bitrate 8500 Kbps. For profile_1, segment_0 was encoded using CAB_4, segment_1 was encoded using CAB_2 and segment_2 was encoded using CAB_3. For example, in profile 1, segment_0 was encoded using the bitrate 5500 Kbps, segment_1 was encoded using the bitrate 7000 Kbps and segment_2 was encoded using the bitrate 6250 Kbps.

The following will now describe the optimization process to dynamically generate a list of candidate average bitrates.

Optimization Process

As discussed above, video content may have diverse characteristics, such as content in different videos may have different characteristics and also content within the same video may have different characteristics. For example, some content may be simple to encode, such as a cartoon or news. However, some content may be difficult to encode, such as in live action movie or sports. The characteristics for the encodings may be different. The following will describe different characteristics for content.

Figure 8:
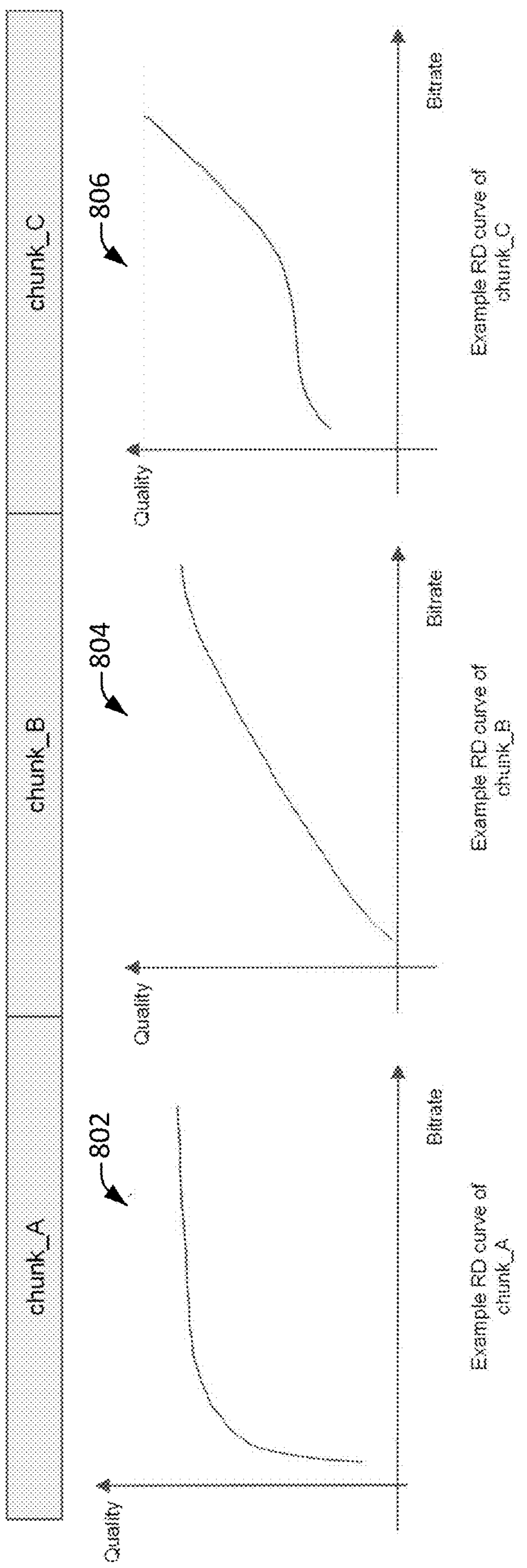
FIG. 8 depicts an example of different rate distortion curves for video content according to some embodiments.

FIG. 8 depicts an example of different rate distortion curves for video content according to some embodiments. A rate distortion curve is used to illustrate the relationship between quality and bitrate, but other metrics may be used to show the relationship between quality and bitrate for video content. The different rate distortion curves may be illustrated for different chunks of a video; however, the rate distortion curves may be different for different portions of a video, such as segments, chunks, multiple chunks, or different videos.

Three chunks of chunk_A, chunk_B, and chunk_C are shown with graphs 802, 804 and 806, respectively, of rate distortion curves for the chunks. In graph 802, the quality changes with a steep slope at lower bitrates, but at higher bitrates, the quality does not change very much. In graph 804, the quality changes as bitrate increases with a steady relationship. In graph 806, the quality at lower bitrates may only minimally change, while the quality increases with a steep slope at higher bitrates.

Figure 9:
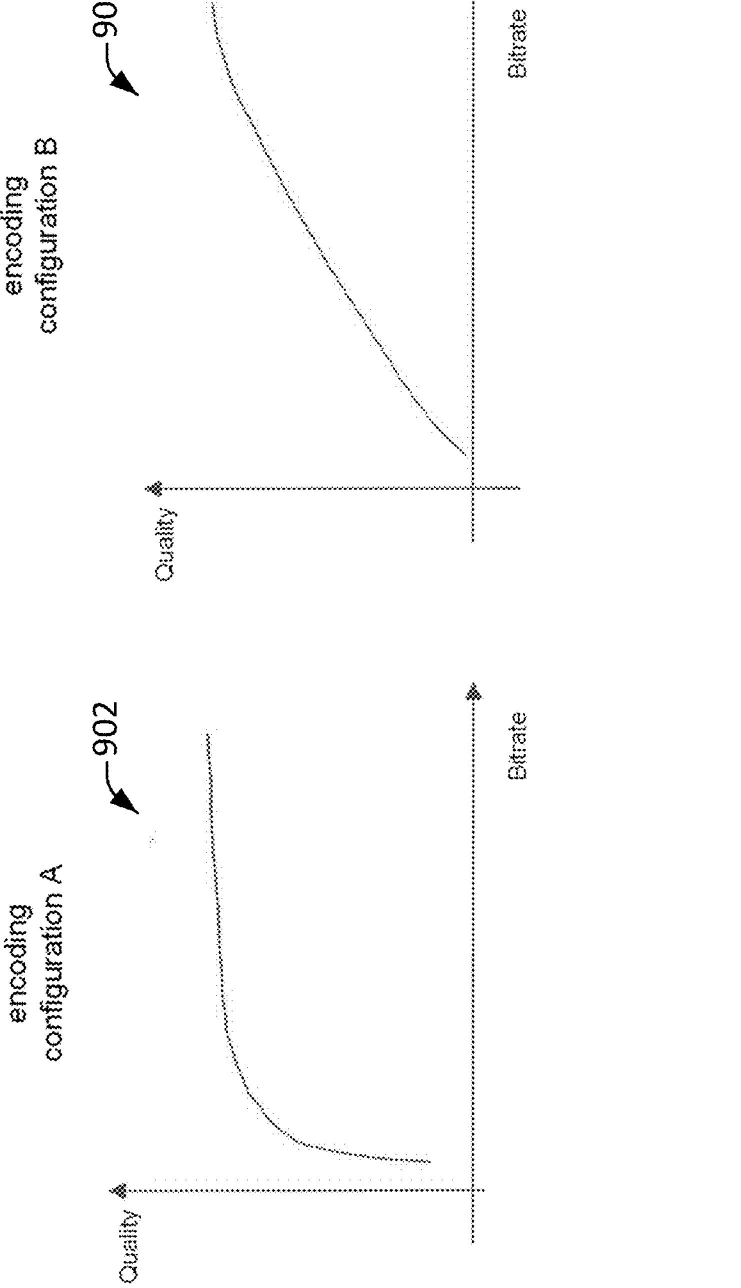
FIG. 9 shows different characteristics using different encoding configurations according to some embodiments.

In addition to different content producing different rate distortion curves, different encoding configurations may also produce different encoding results. Different encoding configurations may include using a different encoder "(e.g., x264, x265, etc.) or different encoding parameters (rate-distortion optimization (RDO) level, B-frames, reference number, etc.). FIG. 9 shows different characteristics using different encoding configurations according to some embodiments. For the same segment or chunk, the first encoding configuration at 902 produces different characteristics compared to a second encoding configuration shown at 904. An encoding configuration A produces a rate distortion curve similar to chunk_A above and encoding configuration B produces a rate distortion curve similar to chunk_B above even though these rate distortion curves are for the same content.

Figure 10:
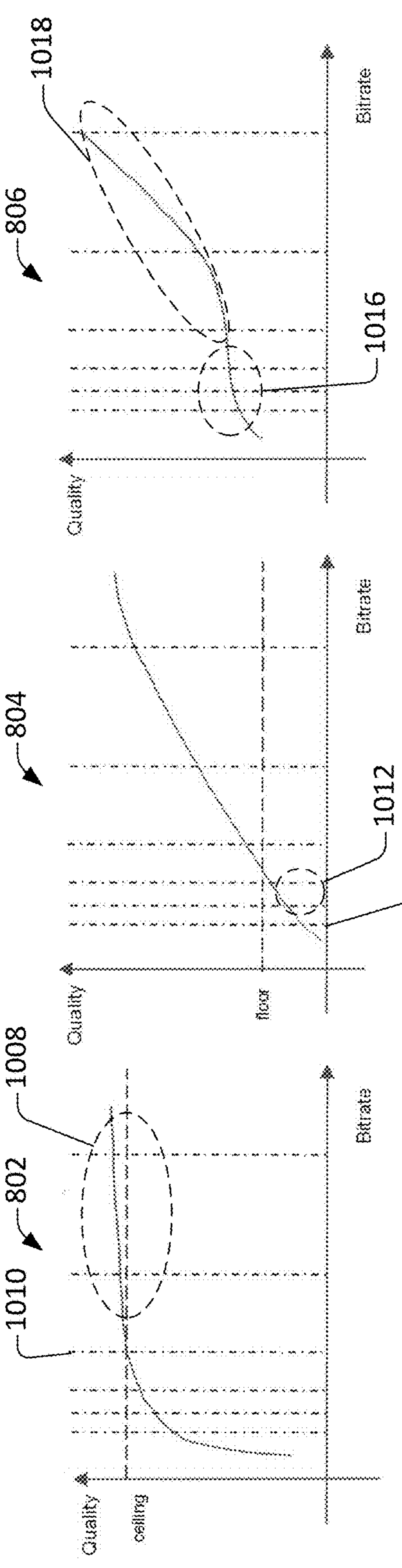
FIG. 10 depicts an example of using static candidate average bitrates for different rate distortion curves according to some embodiments.

Considering the above rate distortion curves may differ, using a static list of candidate average bitrates may not be optimal. For example, using the same list of candidate average bitrates for different rate distortion curves may not produce optimal results. FIG. 10 depicts an example of using static candidate average bitrates for different rate distortion curves according to some embodiments. Graphs 802, 804 and 806 depict the different rate distortion curves for different chunks that were shown in FIG. 8. The dotted lines in each graph show the different bitrates of the list of candidate average bitrates. Some problems may result when using the fixed list of candidate average bitrates. For example, in graph 802, at 1008, the two highest candidate average bitrates may be redundant because they have similar qualities with the third candidate average bitrate at 1010. That is, only one bitrate may need to be encoded, such as at the bitrate listed at 1010, to provide an encoded segment with similar quality.

In graph 804, at 1012, the two candidate average bitrates may be redundant because these two encoded segments have similar qualities compared to an encoded segment with the next lowest bitrate shown at 1014. Similar to above, only one bitrate may need to be encoded, such as at the lowest bitrate at 1014, to provide an encoded segment with similar quality.

In graph 806, at 1016, the lowest three candidate average bitrates may produce encoded segments that have similar qualities. Also, at 1018, the candidate average bitrates may be too far apart because the difference in quality may be too great between the encoded segments. That is, may be more desirable to have more candidate average bitrates with less quality difference to minimize the difference in quality between the candidate average bitrates.

Figure 11:
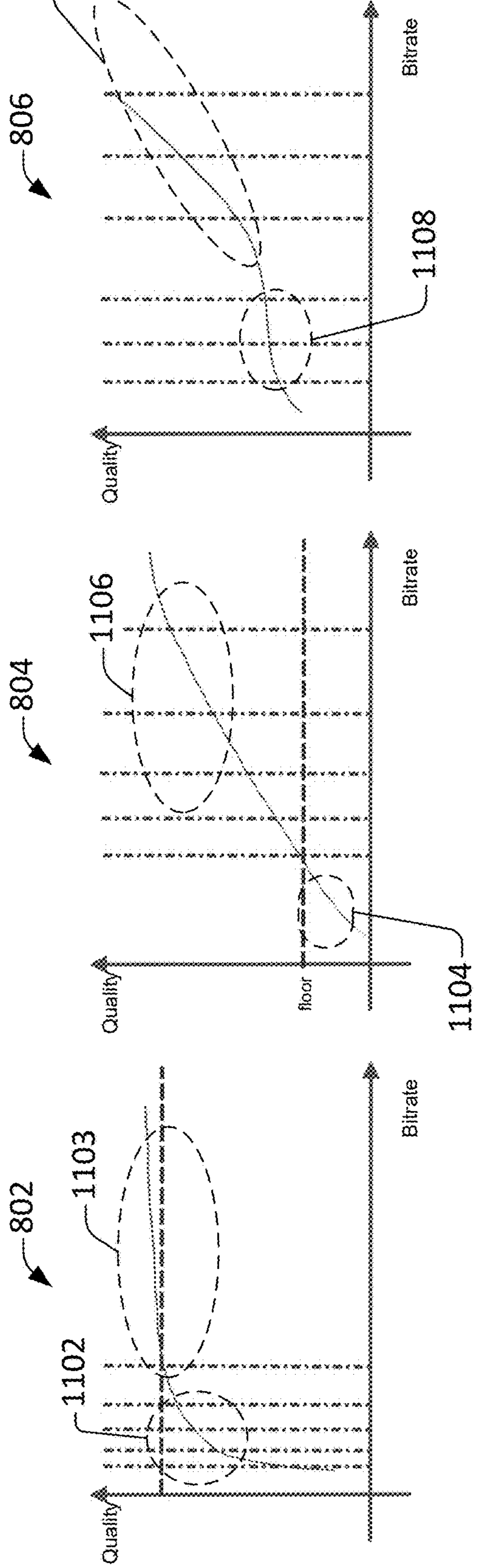
FIG. 11 depicts an optimized candidate average bitrate list according to some embodiments.

FIG. 11 depicts an optimized candidate average bitrate list according to some embodiments. In graph 802, SQA system 108 may dynamically select the candidate average bitrates to optimize the quality found in the encoded segments. For example, at 1102, SQA system 108 may increase a number of candidate average bitrates at bitrates where the curve is steep. Also, at 1103, SQA system 108 may reduce the number of candidate average bitrates where the curve does not change quality very much.

In graph 804, at 1104, SQA system 108 may remove candidate average bitrates from the lowest bitrates where the quality may be redundant. Also, at 1106, SQA system 108 may add additional bitrates to capture the changing quality at higher bitrates.

In graph 806, at 1108, SQA system 108 may remove bitrates at the lower end of the curve. Also, at 1110, SQA system 108 may space the candidate average bitrates more evenly to capture different levels of quality in more even increments.

Pre-Analysis Optimization Process Design

Figure 12:
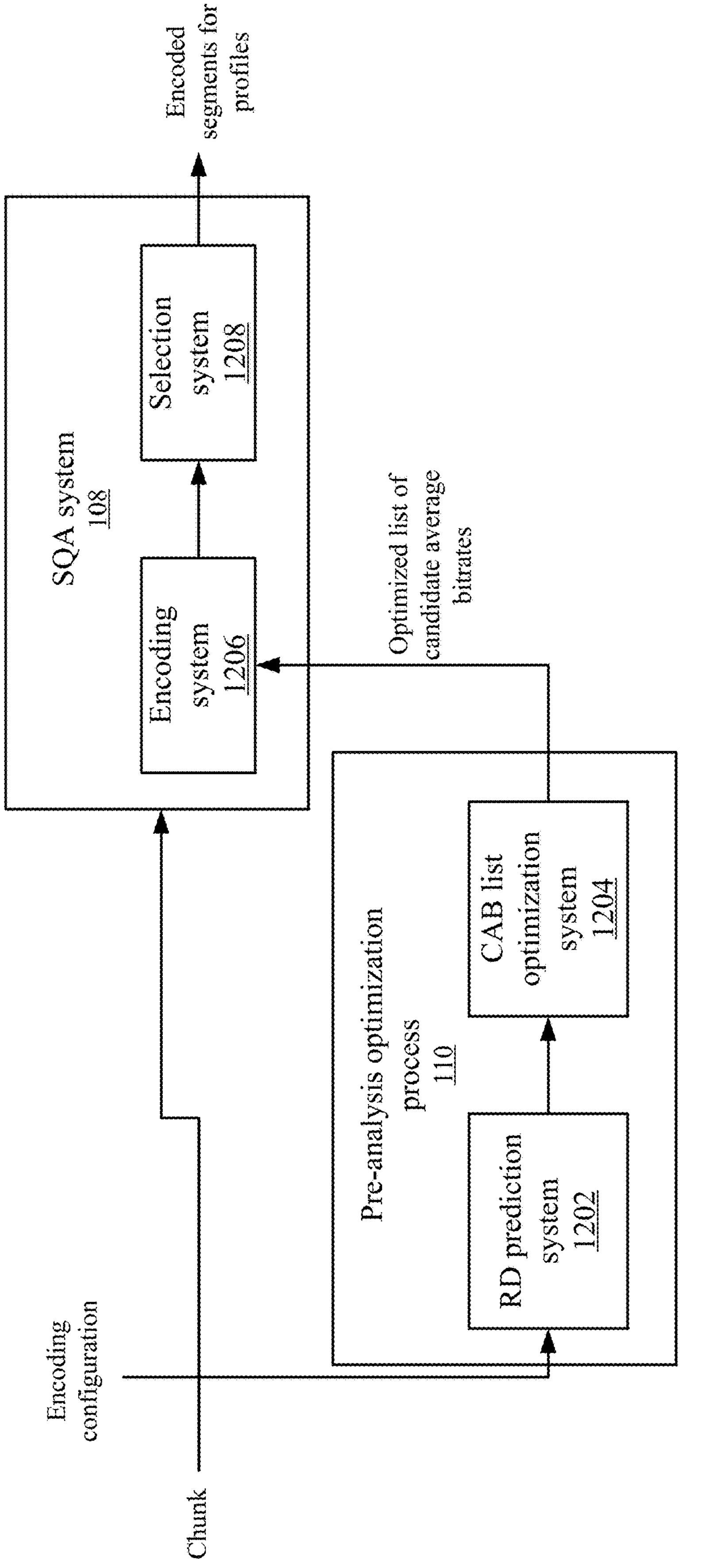
FIG. 12 depicts a more detailed example of a segment quality driven adaptive processing system (SQA) system and pre-analysis optimization process according to some embodiments.

FIG. 12 depicts a more detailed example of SQA system 108 and pre-analysis optimization process 110 according to some embodiments. A chunk to be encoded is received. Also, an encoding configuration may be received that defines settings for encoding the chunk. The encoding configuration may include an encoder type, quality level, etc.

Pre-analysis optimization process 110 may receive the chunk and the encoding configuration, and output an optimized list of candidate average bitrates. An RD prediction system 1202 may predict a rate distortion curve for segments in the chunk and/or the chunk. Although predicting rate distortion curves for segments or chunks may be described, the rate distortion curves may be generated for different portions of the video, such as for multiple chunks and/or multiple segments. As will be discussed in more detail below, RD prediction system 1202 may use machine learning logic to generate the prediction of rate distortion curves for segments.

The predicted rate distortion curves are output to a CAB list optimization system 1204. CAB list optimization system 1204 may optimize a list of candidate average bitrates for a chunk, such as based on the predicted rate distortion curves for the segments in the chunk. The optimized list of candidate average bitrates may be based on the characteristics of respective chunks and may be different for chunks that have content with different characteristics. The process will be described in more detail below.

CAB list optimization system 1204 outputs an optimized list of candidate average bitrates to SQA system 108. SQA system 108 includes an encoding system 1206 that receives the encoding configuration, the chunk, and the optimized list of candidate average bitrates. Then, encoding system 1206 uses each candidate average bitrate in the list to encode each segment of the chunk. After encoding each segment using the list of candidate average bitrates, a selection system 1208 selects an encoded segment for each profile in a profile ladder using a selection process as described above. Selection system 1208 outputs encoded segments that are selected for the profiles in the profile ladder.

The following will describe the prediction of the characteristics of a segment and then the optimization to select the list of candidate average bitrates.

RD Prediction System

Figure 13:
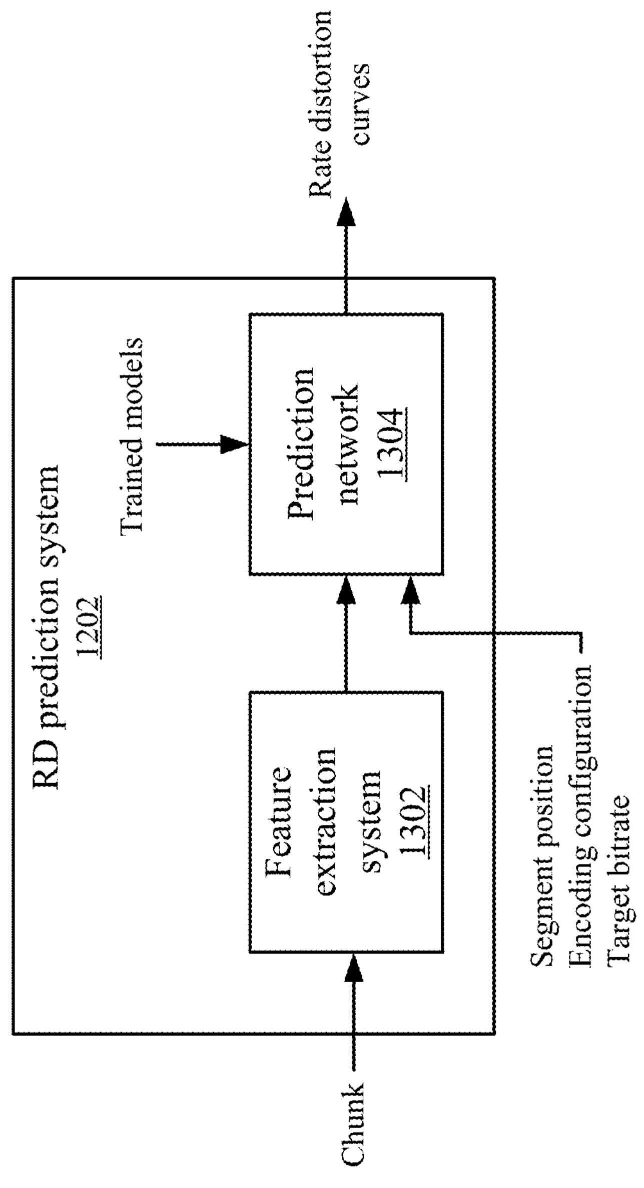
FIG. 13 depicts a more detailed example of a rate distortion (RD) prediction system according to some embodiments.

FIG. 13 depicts a more detailed example of RD prediction system 1202 according to some embodiments. A feature extraction system 1302 receives a chunk of video. Feature extraction system 1302 may then extract values for features that may convey information related to video transcoding. Some examples of features may be about the video content, encoding settings, etc. The features that are extracted may provide better predictions of the characteristics of the segments of the chunk. The values for the features are output to a prediction network 1304.

Prediction network 1304 may use trained models to generate characteristics for segments of the chunk, such as a predicted rate distortion curve. Prediction network 1304 may use different machine learning algorithms, such as support vector machine (SVM) regression, convolution neural networks (CNN), boosting, etc. Trained models may be trained based on the specific machine learning algorithm.

Prediction network 1304 may receive the values for the features in addition to other input, such as the segment position, an encoding configuration, and a target bitrate. The segment position may be the segment position (e.g., which segment in the video) in which to generate a rate distortion curve, the encoding configuration may include configuration will be used to encode the segment, and the target bitrate may include the output bitrate range for the segments. Prediction network 1304 may output rate distortion curves for the segments between the output bitrate range based on the features.

Figure 14:
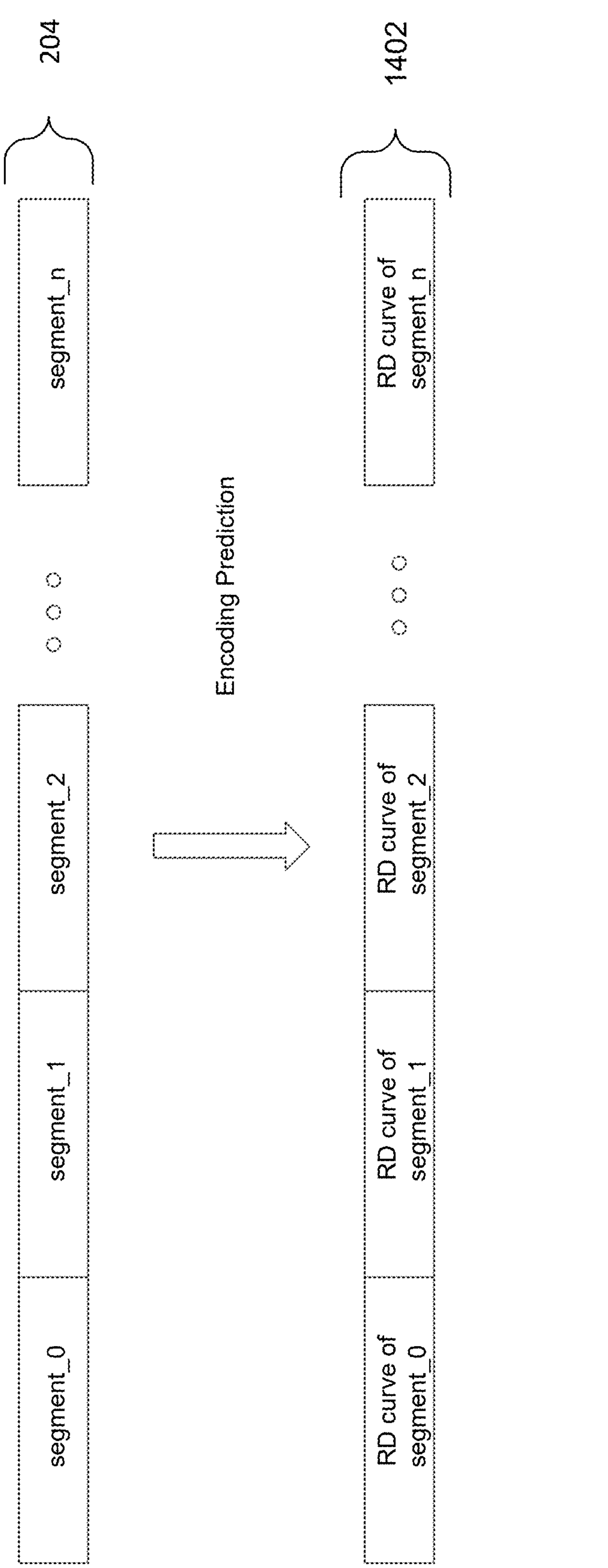
FIG. 14 depicts the output of a prediction network according to some embodiments.

FIG. 14 depicts the output of prediction network 1304 according to some embodiments. At 204, segments for a chunk include segment_0, segment_1, segment_2, . . . , segment_n. A rate distortion curve may be generated for each segment in each chunk of the video. For example, at 1402, rate distortion curves are output for each respective segment. A rate distortion curve of segment_0, a rate distortion curve of segment_1, etc. are shown. Each rate distortion curve is based on characteristics for a respective segment. The list of candidate average bitrates for the chunk may be generated based on the rate distortion curves. Also, a chunk level rate distortion curve may be output.

List of Candidate Average Bitrate Optimization

Figure 15:
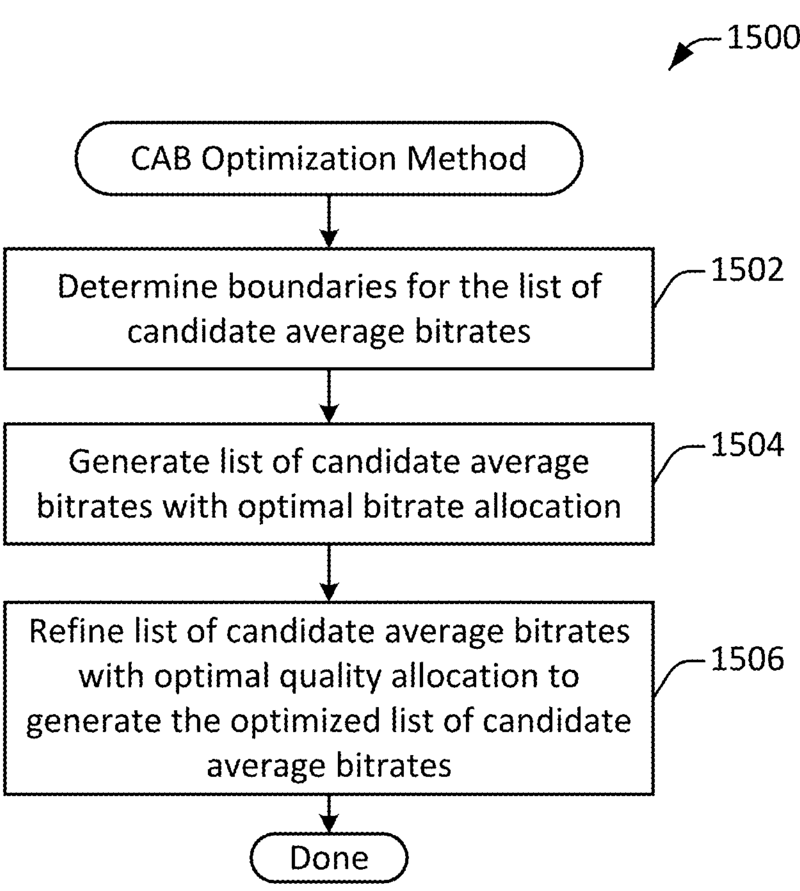
FIG. 15 depicts a simplified flow chart of a method for performing an optimization process for selecting the list of candidate average bitrates according to some embodiments.

FIG. 15 depicts a simplified flow chart 1500 of a method for performing an optimization process for selecting the list of candidate average bitrates according to some embodiments. At 1502, CAB list optimization system 1204 determines boundaries for the list of candidate average bitrates. For example, the boundaries may be a maximum bitrate and a minimum bitrate that can be used for the list of candidate average bitrates. Different methods may be used to determine the boundaries and are described in more detail in FIG. 16.

At 1504, CAB list optimization system 1204 generates a list of potential candidate average bitrates with optimal bitrate allocation. In some embodiments, one list of potential candidate average bitrates is generated for a chunk based on the maximum bitrate and the minimum bitrate determined at 502. The list of potential candidate average bitrates may be generated using different methods. One method may be using a predefined list that falls between the minimum bitrate and the maximum bitrate. For example, the predefined list may include bitrates from target average bitrates and intermediate average bitrates. For example, bitrates from the predefined list within the minimum and maximum may be used. Another method may determine a total number of potential candidate average bitrates and divide the bitrate range between the minimum bitrate and the maximum bitrate into intervals. Different examples may be used, such as:

Equal division: interval_(i+1)/interval_i=1

Progressive division: interval_(i+1)=interval_i+delta

Geometric division: interval (i+1)/interval_i=1.5, 1.618 . . .

Fibonacci division: interval_(i+2)=interval_(i+1)+interval_i, where interval_i is an interval value of i, interval_(i+1) is interval value+1, interval_(i+2) is interval value+2, and delta is a predefined value.

The total number of intervals may be set to a number, such as 10. The interval of interval_i may be set based on the above methods by dividing the range into the total number. CAB list optimization system 1204 then selects the bitrates based on the interval value to divide the range of bitrates between the minimum bitrate and the maximum bitrate into a list of bitrates. For example, a minimum bitrate of 2000 and a maximum bitrate of 10,000 with an interval of 1500 and a total number of bitrates of five may result in a list of bitrates of 10,000, 7500, 5000, 3500, and 2000 when using equal division.

At 1506, CAB list optimization system 1204 refines the list of potential candidate average bitrates with optimal quality allocation to generate the optimized list of candidate average bitrates. The quality allocation may examine per segment quality and determine whether the quality fulfills one or more rules. For example, redundant candidate average bitrates may be removed, such as candidate average bitrates that have similar quality. Also, additional candidate average bitrates may be added as needed, such as when adjacent candidate average bitrates have a quality gap that is above the threshold, such as a difference that is too large. The process will be described in more detail in FIGS. 17, 18, and 19.

Figure 16:
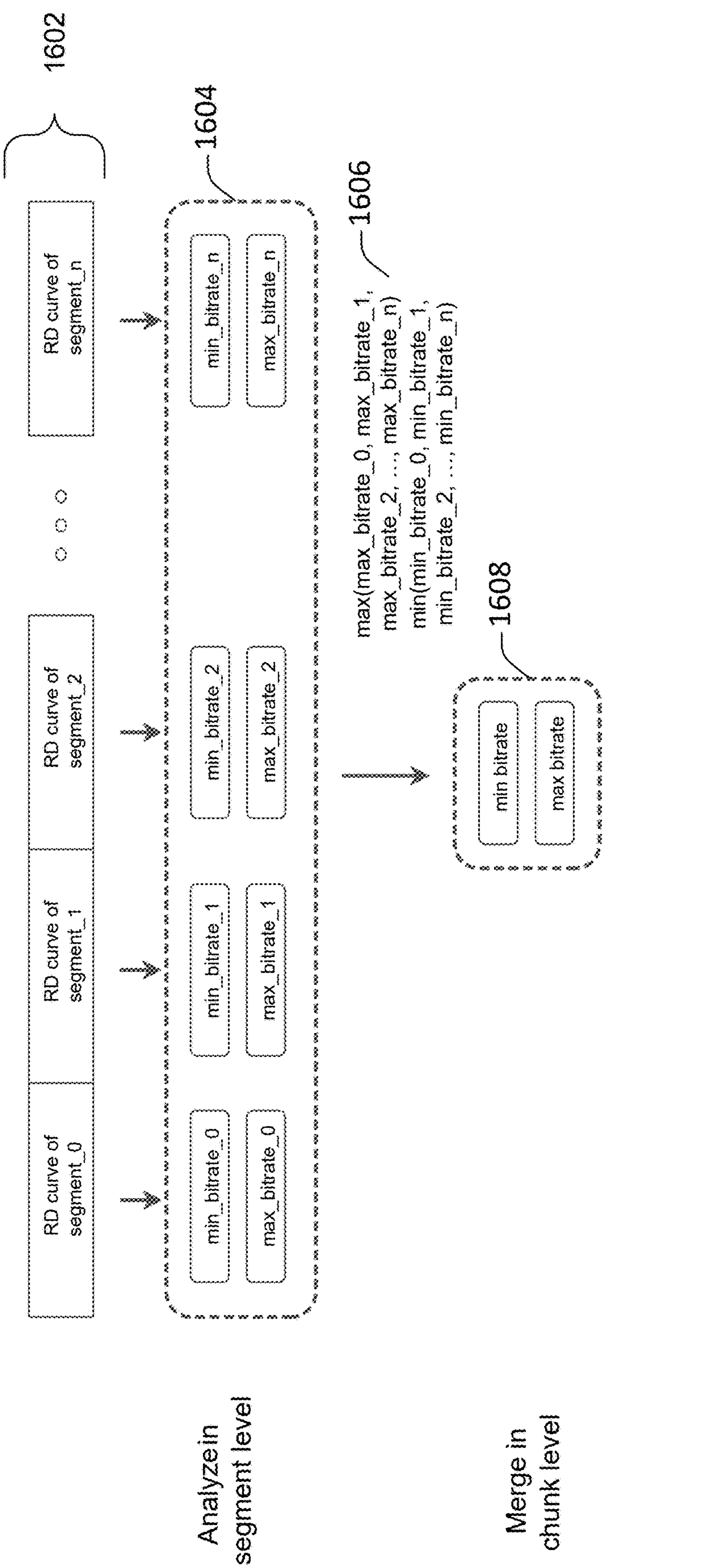
FIG. 16 depicts an example of determining the boundaries for the list of candidate average bitrates according to some embodiments.

As described in 1502 in FIG. 15, CAB list optimization system 1204 determines the boundaries for the list of candidate average bitrates. FIG. 16 depicts an example of determining the boundaries for the list of candidate average bitrates according to some embodiments. Although the following process is described, other processes may be appreciated. For example, a setting may be used to determine the minimum bitrate and the maximum bitrate. In this example, CAB list optimization system 1204 may analyze the minimum bitrates and the maximum bitrates for rate distortion curves for respective segments in a chunk and determine what the minimum bitrate and the maximum bitrate should be at the chunk level.

At 1602, rate distortion curves for respective segments are received and analyzed. Then, CAB list optimization system 1204 may select the minimum bitrate and the maximum bitrate for each segment based on the respective rate distortion curve for the segment. For example, for segment_0, a minimum bitrate and a maximum bitrate are selected based on the characteristics of the rate distortion curve for segment_0. For example, CAB list optimization system 1204 may set a maximum quality threshold and a minimum quality threshold, and use the rate distortion curve to determine the minimum bitrate that corresponds to the minimum quality threshold and the maximum bitrate that corresponds to the maximum quality threshold. For segment_1, CAB list optimization system 1204 selects a minimum bitrate and a maximum bitrate based on the characteristics of the rate distortion curve for segment_1, and so on.

The above analysis was performed at the segment level. Then, CAB list optimization system 1204 analyzes the segment level results to determine a minimum value and a maximum value at the chunk level. At 1606, CAB list optimization system 1204 determines a maximum value from the values for the maximum bitrates for the segments, such as from max_bitrate_0, max_bitrate_1, max_bitrate_2, . . . , max_bitrate_n. Also, CAB list optimization system 1204 determines a minimum value from the values for the minimum bitrates for the segments, such as from min_bitrate_0, min_bitrate_1, min_bitrate_2, . . . , min_bitrate_n.

At 1608, CAB list optimization system 1204 outputs the minimum bitrate and the maximum bitrate for the chunk. In this case, the lowest minimum bitrate from the minimum bitrates for the segments is selected and the highest maximum bitrate from the maximum bitrates for the segments is selected. The selection process may take into account the individual characteristics of rate distortion curves for segments and select a minimum bitrate and a maximum bitrate that may be inclusive of all of the minimum bitrates and the maximum bitrates that were determined at the segment level. For example, if the minimum bitrates are 2000, 3000, and 3500, the minimum bitrate that is selected will be 2000. Similarly, if the maximum bitrates are 10000, 9000, and 8500, the maximum bitrate that is selected will be 10000. Although the above process may be used, other methods of selecting the minimum bitrate and the maximum bitrate may be appreciated, such as taking an average of the values.

Figure 17:
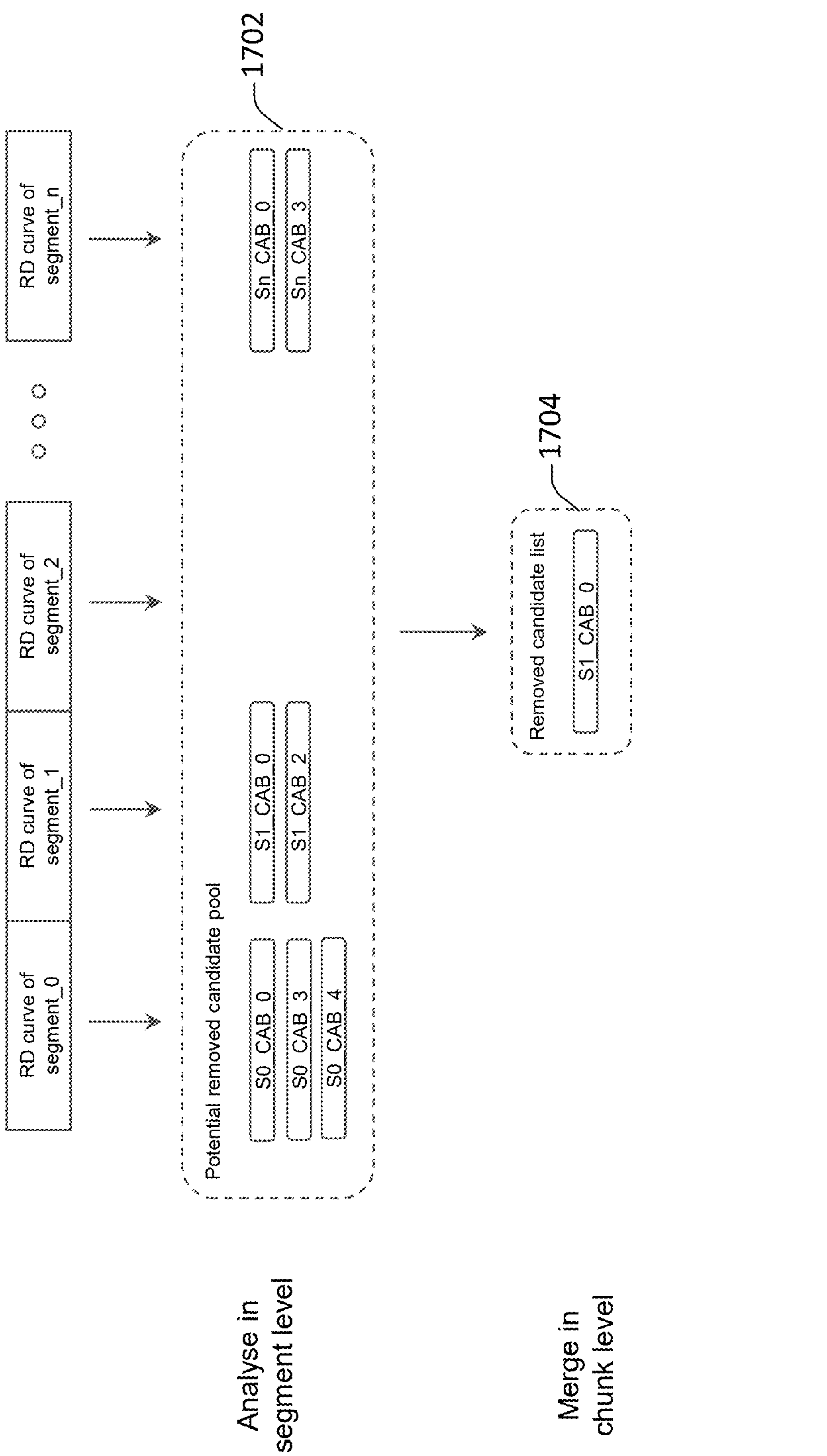
FIG. 17 depicts an example of removing candidate average bitrates based on quality according to some embodiments.

As described in 1506 in FIG. 15, CAB list optimization system 1204 defines the list of candidate average bitrates with optimal quality allocation. One part of the allocation involves removing candidate average bitrates based on similar quality. The similarity of quality may be defined in different ways. For example, CAB list optimization system 1204 a distance between values of quality to determine whether some candidate average bitrates should be removed. FIG. 17 depicts an example of removing candidate average bitrates based on quality according to some embodiments. In this example, CAB list optimization system 1204 may determine if the quality levels of two adjacent candidate average bitrates meet a threshold, such as are within a threshold. Then, the candidate with the higher bitrate may be removed.

At 1702, each segment may have an associated potential removal list of encoded segments that can be potentially removed. As shown, for segment_0, CAB list optimization system 1204 has determined that the candidate average bitrates of S0_CAB_0, S0_CAB_3 and S0_CAB_4 may be removed. These candidate average bitrates may be removed because the encoded segments may have a similar quality level that meets a threshold with an adjacent encoded segment. Similarly, for segment_1, CAB list optimization system 1204 has determined that the candidate average bitrates of S1_CAB_0 and S1_CAB_2 may be removed, and for segment_n, CAB list optimization system 1204 has determined that the candidate average bitrates for Sn_CAB_0 and Sn_CAB_3 may be removed. No segments are removed for segment_2 because no segments are determined to have similar quality within a threshold.

The above analysis was at the segment level. Then, at 1704, CAB list optimization system 1204 may use the segment level candidate average bitrates to determine candidate average bitrates to remove at the chunk level. For example, based on the occurrence of a candidate average bitrate in different segments of the potential removal list, CAB list optimization system 1204 may select candidate average bitrates for the chunk level. In some embodiments, CAB list optimization system 1204 may select a candidate average bitrate and calculate the total number of occurrences in the potential removed candidate pool. If the total number for this candidate average bitrate meets a threshold, such as is at or above a threshold, CAB list optimization system 1204 puts this candidate average bitrate in the removed candidate list at the chunk level. For example, the candidate average bitrate CAB_0 is found in three of the segments described above (e.g., segment_0, segment_1, and segment_n) and meets a threshold of "3". Then, CAB list optimization system 1204 puts the candidate average bitrate of CAB_0 into the removed candidate list. Candidate average bitrates CAB_2, CAB_3 and CAB_4 may not meet the threshold because the bitrates occur in two or fewer segments in the potential removal list. Accordingly, CAB list optimization system 1204 does not put these candidate average bitrates in the removed candidate list. Other methods of selecting which candidate average bitrates to remove may be appreciated.

The above analysis was performed at the segment level and merged to the chunk level. However, the process may be performed at different levels. For example, the analysis may be used to merge candidate average bitrates from multiple chunks to portion of video that covers the multiple chunks level or from multiple chunks to the video level.

Figure 18:
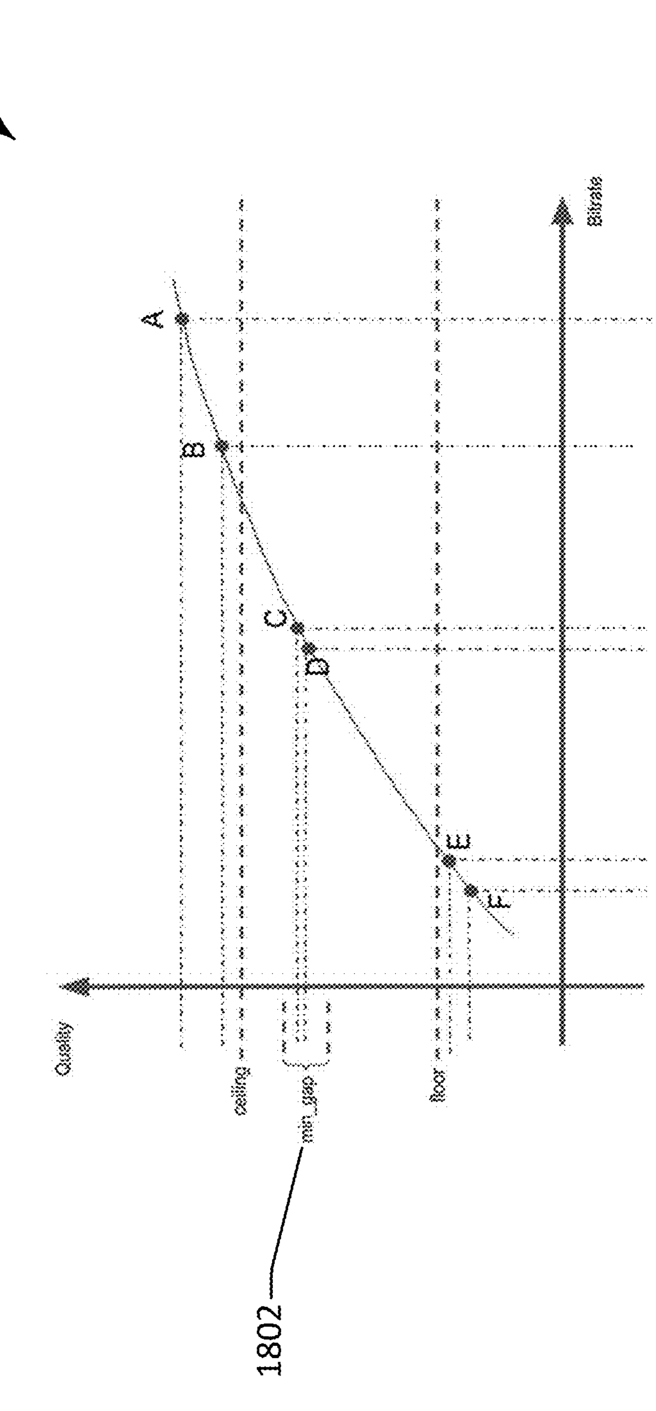
FIG. 18 depicts an example where a minimum gap is used to remove a candidate average bitrate according to some embodiments.

The following will describe an example of removing candidate average bitrates. FIG. 18 depicts an example where a minimum gap is used to remove a candidate average bitrate according to some embodiments. For example, at 1802, candidate average bitrates C and D have similar quality levels that meet a threshold, such as a threshold min_gap. In this case, CAB list optimization system 1204 determines that one of the candidate average bitrates should be removed, such as candidate average bitrate C because this candidate average bitrate is adjacent to candidate average bitrate D and candidate average bitrate C has a larger bitrate than candidate average bitrate D, but with minimal quality advantages. In this case, CAB list optimization system 1204 may compare a difference between the values of quality for adjacent candidate average bitrates to the threshold, min_gap, and remove one of the candidate average bitrates when the threshold is met.

Figure 19:
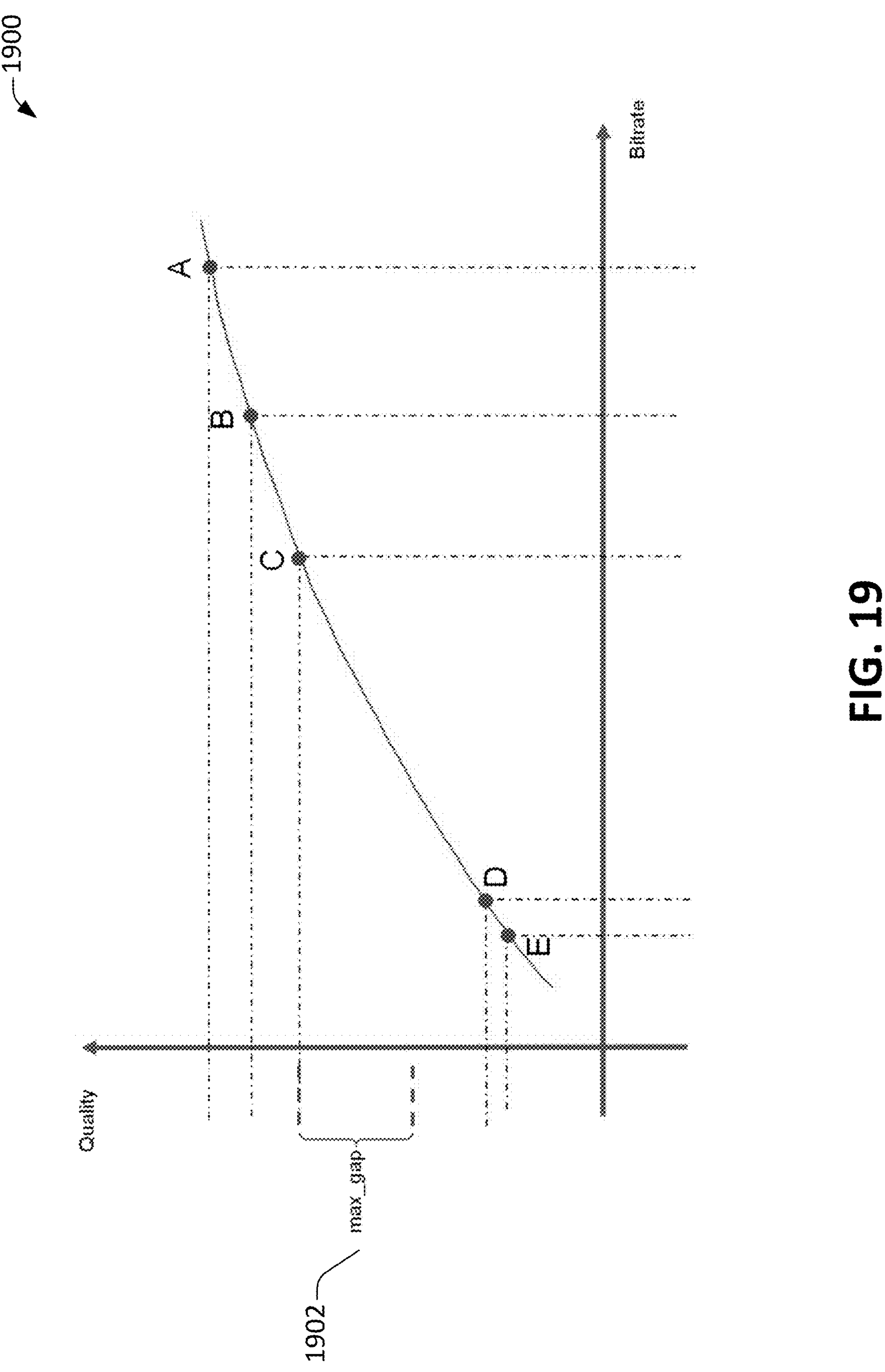
FIG. 19 depicts a graph that shows where adding candidate average bitrates may be advantageous according to some embodiments.

Another part of the quality allocation involves adding candidate average bitrates based on a gap of quality. FIG. 19 depicts a graph 1900 that shows where adding candidate average bitrates may be advantageous according to some embodiments. CAB list optimization system 1204 may use a threshold, such as a maximum gap max_gap at 1902, to determine when to add candidate average bitrates. For example, if there is a gap of quality values between adjacent candidate average bitrates that is larger than the threshold max_gap, such as between candidate average bitrates C and D in graph 1900, CAB list optimization system 1204 may add a candidate average bitrate in between candidate average bitrates C and D on the rate distortion curve.

Different methods may be used to determine how many new candidate average bitrates should be added. CAB list optimization system 1204 may add "i" new candidates when two candidates that are separated by a threshold based on a ratio. For example, different ratios may configure the gap between added candidates, such as a 1:1, which means each gap is equal, 1:1.5, which means each gap is 1.5, or other ratios.

In one possible process, the variable i is set to i=1, CAB list optimization system 1204 adds i new candidate average bitrates based on a ratio. For example, one candidate average bitrate named "F" may be added between points C and D. Then, if all the gaps between the new adjacent candidate average bitrates are less than the threshold max_gap, then the process is finished. However, if not, the value for the variable i is incremented, such as to "2" and two new candidates are added in between the candidate average bitrates based on the ratio. For example, two more candidate average bitrates may be added between points C and F and F and D. The process then continues as described above. Once candidate average bitrates have been added such that there are no gaps greater than the threshold between candidate average bitrates D and C, the candidate average bitrates are output.

Figure 20:
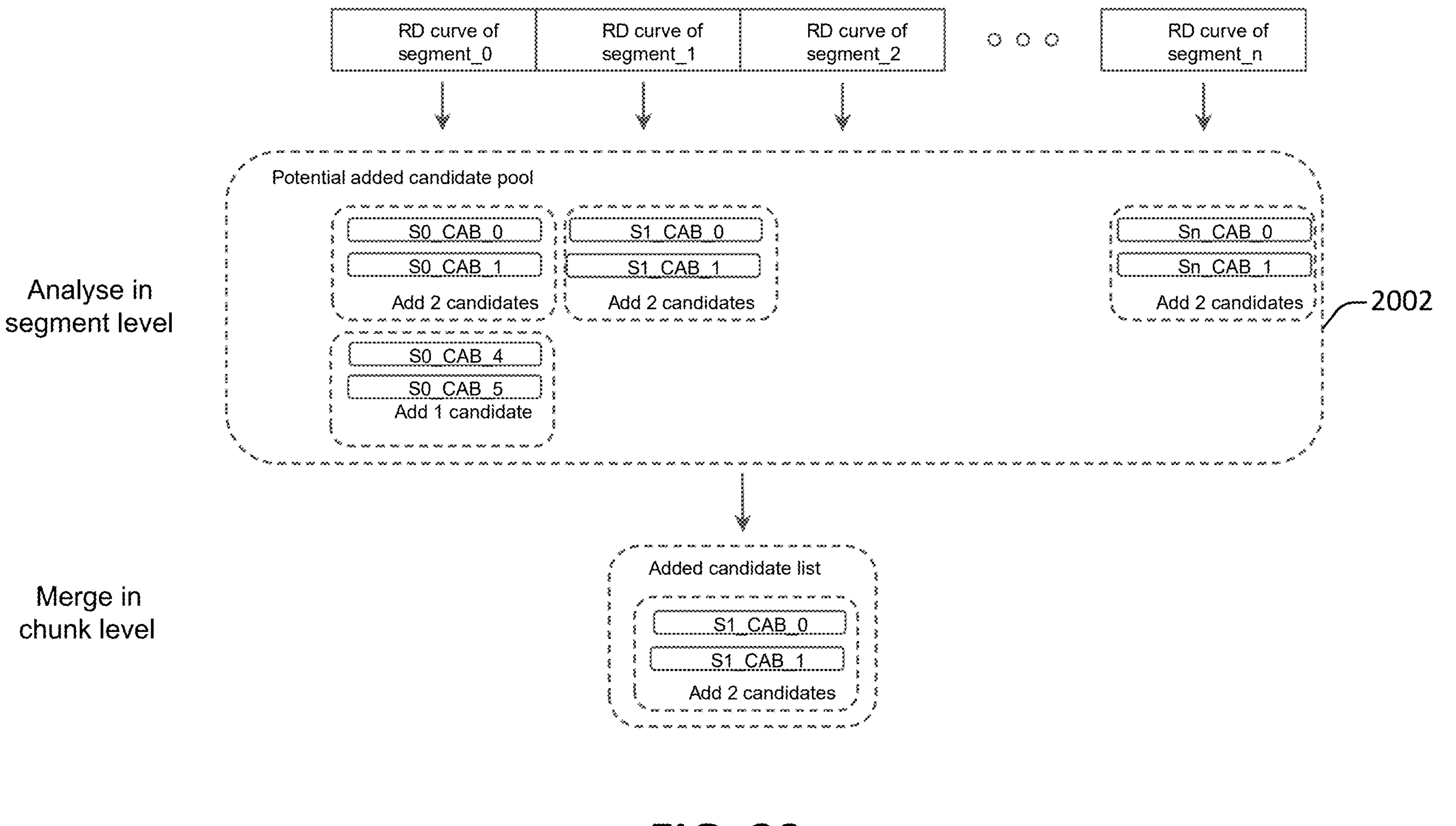
FIG. 20 depicts the determination of adding candidate average bitrates according to some embodiments.

The above process is determined for each segment. Then, CAB list optimization system 1204 may take the potential added candidate average bitrates at the segment level and merge the candidate average bitrates at the chunk level. FIG. 20 depicts the determination of adding candidate average bitrates according to some embodiments. At 2002, each segment may have candidate average bitrates that may be potentially added. For segment_0, two candidate average bitrates may be added in between candidate average bitrates CAB_0 and CAB_1. Also, one candidate average bitrate may be added between CAB_4 and CAB_5. For segment_1, two candidate average bitrates may be added between candidate average bitrate CAB_0 and CAB_1. For segment_n, two candidate average bitrates may be added between candidate average bitrate CAB_0 and CAB_1. Accordingly, three segments have added two candidate average bitrates between candidate average bitrate CAB_0 and CAB_1 and one segment added one candidate average bitrate between CAB_4 and CAB_5.

CAB list optimization system 1204 may use the segment level candidates to determine an added candidate list for the chunk. For example, to be added to the added candidate list at the chunk level, CAB list optimization system 1204 may determine whether potential added candidate average bitrates at the segment level are found within a threshold, such as a number of segments. If the threshold is 70% of the segments, CAB list optimization system 1204 adds two candidates between the candidate average bitrates CAB_0 and CAB_1 because these candidates are found in greater than 70% of the segments (3 segments out of 4). CAB list optimization system 1204 does not add candidates between CAB_4 and CAB_5 because this addition is only found in segment_0 and is less than 70% of the segments. In this case, adding the additional candidate average bitrate may not be needed because only one segment requires the addition and it may not be useful to add a candidate average bitrate for all the other segments of the chunk if only one segment is affected. However, the addition of two candidate average bitrates between the candidate average bitrates CAB_0 and CAB_1 may be beneficial because more than 70% of the segments had the potential addition.

The output of CAB list optimization system 1204 is a candidate average bitrate list for each chunk. For example, the list of candidate average bitrates for each chunk as described in FIG. 3A are output by CAB list optimization system 1204 according to some embodiments.

CONCLUSION

Accordingly, the list of candidate average bitrates may be optimized based on the characteristics found in each segment. This produces an improved candidate average bitrate list for each chunk that is optimized for respective characteristics of the chunk. The candidate average bitrates may improve the quality the selection of encoded segments that are available to select for profiles for each chunk. This may improve the quality of the video in addition to improving the playback experience.

System

Figure 21:
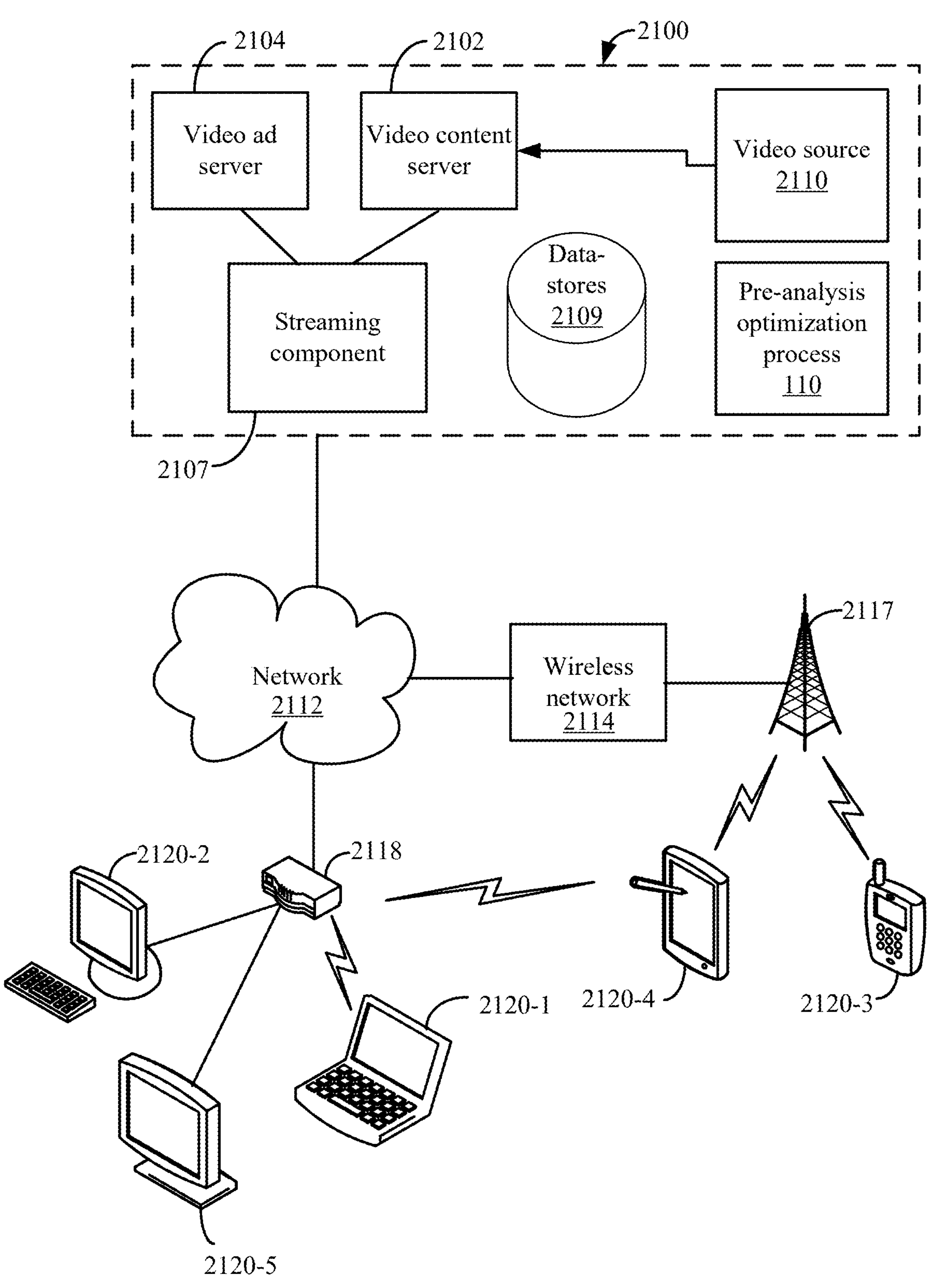
FIG. 21 depicts a video streaming system in communication with multiple client devices via one or more communication networks according to one embodiment.

Features and aspects as disclosed herein may be implemented in conjunction with a video streaming system 2100 in communication with multiple client devices via one or more communication networks as shown in FIG. 21. Aspects of the video streaming system 2100 are described merely to provide an example of an application for enabling distribution and delivery of content prepared according to the present disclosure. It should be appreciated that the present technology is not limited to streaming video applications and may be adapted for other applications and delivery mechanisms.

In one embodiment, a media program provider may include a library of media programs. For example, the media programs may be aggregated and provided through a site (e.g., website), application, or browser. A user can access the media program provider's site or application and request media programs. The user may be limited to requesting only media programs offered by the media program provider.

In system 2100, video data may be obtained from one or more sources for example, from a video source 2110, for use as input to a video content server 2102. The input video data may comprise raw or edited frame-based video data in any suitable digital format, for example, Moving Pictures Experts Group (MPEG)-1, MPEG-2, MPEG-4, VC-1, H.264/Advanced Video Coding (AVC), High Efficiency Video Coding (HEVC), or other format. In an alternative, a video may be provided in a non-digital format and converted to digital format using a scanner or transcoder. The input video data may comprise video clips or programs of various types, for example, television episodes, motion pictures, and other content produced as primary content of interest to consumers. The video data may also include audio or only audio may be used.

The video streaming system 2100 may include one or more computer servers or modules 2102, 2104, and 2107 distributed over one or more computers. Each server 2102, 2104, 2107 may include, or may be operatively coupled to, one or more data stores 2109, for example databases, indexes, files, or other data structures. A video content server 2102 may access a data store (not shown) of various video segments. The video content server 2102 may serve the video segments as directed by a user interface controller communicating with a client device. As used herein, a video segment refers to a definite portion of frame-based video data, such as may be used in a streaming video session to view a television episode, motion picture, recorded live performance, or other video content.

In some embodiments, a video advertising server 2104 may access a data store of relatively short videos (e.g., 10 second, 30 second, or 60 second video advertisements) configured as advertising for a particular advertiser or message. The advertising may be provided for an advertiser in exchange for payment of some kind or may comprise a promotional message for the system 2100, a public service message, or some other information. The video advertising server 2104 may serve the video advertising segments as directed by a user interface controller (not shown).

The video streaming system 2100 also may include pre-analysis optimization process 110.

The video streaming system 2100 may further include an integration and streaming component 2107 that integrates video content and video advertising into a streaming video segment. For example, streaming component 2107 may be a content server or streaming media server. A controller (not shown) may determine the selection or configuration of advertising in the streaming video based on any suitable algorithm or process. The video streaming system 2100 may include other modules or units not depicted in FIG. 21, for example, administrative servers, commerce servers, network infrastructure, advertising selection engines, and so forth.

The video streaming system 2100 may connect to a data communication network 2112. A data communication network 2112 may comprise a local area network (LAN), a wide area network (WAN), for example, the Internet, a telephone network, a wireless network 2114 (e.g., a wireless cellular telecommunications network (WCS)), or some combination of these or similar networks.

One or more client devices 2120 may be in communication with the video streaming system 2100, via the data communication network 2112, wireless network 2114, or another network. Such client devices may include, for example, one or more laptop computers 2120-1, desktop computers 2120-2, "smart" mobile phones 2120-3, tablet devices 2120-4, network-enabled televisions 2120-5, or combinations thereof, via a router 2118 for a LAN, via a base station 2117 for wireless network 2114, or via some other connection. In operation, such client devices 2120 may send and receive data or instructions to the system 2100, in response to user input received from user input devices or other input. In response, the system 2100 may serve video segments and metadata from the data store 2109 responsive to selection of media programs to the client devices 2120. Client devices 2120 may output the video content from the streaming video segment in a media player using a display screen, projector, or other video output device, and receive user input for interacting with the video content.

Distribution of audio-video data may be implemented from streaming component 2107 to remote client devices over computer networks, telecommunications networks, and combinations of such networks, using various methods, for example streaming. In streaming, a content server streams audio-video data continuously to a media player component operating at least partly on the client device, which may play the audio-video data concurrently with receiving the streaming data from the server. Although streaming is discussed, other methods of delivery may be used. The media player component may initiate play of the video data immediately after receiving an initial portion of the data from the content provider. Traditional streaming techniques use a single provider delivering a stream of data to a set of end users. High bandwidth and processing power may be required to deliver a single stream to a large audience, and the required bandwidth of the provider may increase as the number of end users increases.

Streaming media can be delivered on-demand or live. Streaming enables immediate playback at any point within the file. End-users may skip through the media file to start playback or change playback to any point in the media file. Hence, the end-user does not need to wait for the file to progressively download. Typically, streaming media is delivered from a few dedicated servers having high bandwidth capabilities via a specialized device that accepts requests for video files, and with information about the format, bandwidth, and structure of those files, delivers just the amount of data necessary to play the video, at the rate needed to play it. Streaming media servers may also account for the transmission bandwidth and capabilities of the media player on the destination client. Streaming component 2107 may communicate with client device 2120 using control messages and data messages to adjust to changing network conditions as the video is played. These control messages can include commands for enabling control functions such as fast forward, fast reverse, pausing, or seeking to a particular part of the file at the client.

Since streaming component 2107 transmits video data only as needed and at the rate that is needed, precise control over the number of streams served can be maintained. The viewer will not be able to view high data rate videos over a lower data rate transmission medium. However, streaming media servers (1) provide users random access to the video file, (2) allow monitoring of who is viewing what video programs and how long they are watched (3) use transmission bandwidth more efficiently, since only the amount of data required to support the viewing experience is transmitted, and (4) the video file is not stored in the viewer's computer, but discarded by the media player, thus allowing more control over the content.

Streaming component 2107 may use TCP-based protocols, such as HyperText Transfer Protocol (HTTP) and Real Time Messaging Protocol (RTMP). Streaming component 2107 can also deliver live webcasts and can multicast, which allows more than one client to tune into a single stream, thus saving bandwidth. Streaming media players may not rely on buffering the whole video to provide random access to any point in the media program. Instead, this is accomplished using control messages transmitted from the media player to the streaming media server. Other protocols used for streaming are HTTP live streaming (HLS) or Dynamic Adaptive Streaming over HTTP (DASH). The HLS and DASH protocols deliver video over HTTP via a playlist of small segments that are made available in a variety of bitrates typically from one or more content delivery networks (CDNs). This allows a media player to switch both bitrates and content sources on a segment-by-segment basis. The switching helps compensate for network bandwidth variances and infrastructure failures that may occur during playback of the video.

The delivery of video content by streaming may be accomplished under a variety of models. In one model, the user pays for the viewing of video programs, for example, paying a fee for access to the library of media programs or a portion of restricted media programs, or using a pay-per-view service. In another model widely adopted by broadcast television shortly after its inception, sponsors pay for the presentation of the media program in exchange for the right to present advertisements during or adjacent to the presentation of the program. In some models, advertisements are inserted at predetermined times in a video program, which times may be referred to as "ad slots" or "ad breaks." With streaming video, the media player may be configured so that the client device cannot play the video without also playing predetermined advertisements during the designated ad slots.

Figure 22:
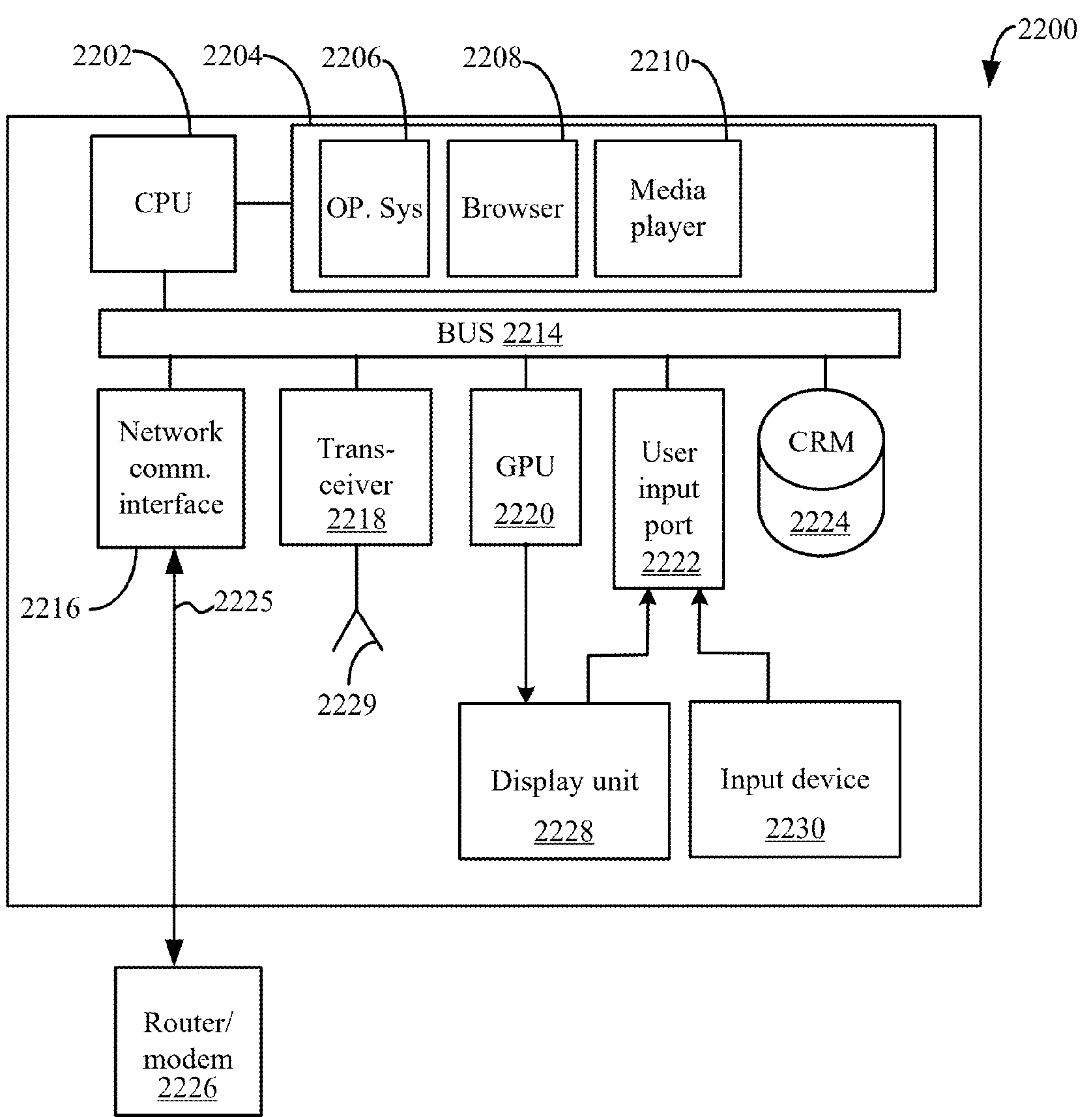
FIG. 22 depicts a diagrammatic view of an apparatus for viewing video content and advertisements.

Referring to FIG. 22, a diagrammatic view of an apparatus 2200 for viewing video content and advertisements is illustrated. In selected embodiments, the apparatus 2200 may include a processor (CPU) 2202 operatively coupled to a processor memory 2204, which holds binary-coded functional modules for execution by the processor 2202. Such functional modules may include an operating system 2206 for handling system functions such as input/output and memory access, a browser 2208 to display web pages, and media player 2210 for playing video. The memory 2204 may hold additional modules not shown in FIG. 22, for example modules for performing other operations described elsewhere herein.

A bus 2214 or other communication component may support communication of information within the apparatus 2200. The processor 2202 may be a specialized or dedicated microprocessor configured or operable to perform particular tasks in accordance with the features and aspects disclosed herein by executing machine-readable software code defining the particular tasks. Processor memory 2204 (e.g., random access memory (RAM) or other dynamic storage device) may be connected to the bus 2214 or directly to the processor 2202, and store information and instructions to be executed by a processor 2202. The memory 2204 may also store temporary variables or other intermediate information during execution of such instructions.

A computer-readable medium in a storage device 2224 may be connected to the bus 2214 and store static information and instructions for the processor 2202; for example, the storage device (CRM) 2224 may store the modules for operating system 2206, browser 2208, and media player 2210 when the apparatus 2200 is powered off, from which the modules may be loaded into the processor memory 2204 when the apparatus 2200 is powered up. The storage device 2224 may include a non-transitory computer-readable storage medium holding information, instructions, or some combination thereof, for example instructions that when executed by the processor 2202, cause the apparatus 2200 to be configured or operable to perform one or more operations of a method as described herein.

A network communication (comm.) interface 2216 may also be connected to the bus 2214. The network communication interface 2216 may provide or support two-way data communication between the apparatus 2200 and one or more external devices, e.g., the streaming system 2100, optionally via a router/modem 2226 and a wired or wireless connection 2225. In the alternative, or in addition, the apparatus 2200 may include a transceiver 2218 connected to an antenna 2229, through which the apparatus 2200 may communicate wirelessly with a base station for a wireless communication system or with the router/modem 2226. In the alternative, the apparatus 2200 may communicate with a video streaming system 2100 via a local area network, virtual private network, or other network. In another alternative, the apparatus 2200 may be incorporated as a module or component of the system 2100 and communicate with other components via the bus 2214 or by some other modality.

The apparatus 2200 may be connected (e.g., via the bus 2214 and graphics processing unit 2220) to a display unit 2228. A display 2228 may include any suitable configuration for displaying information to an operator of the apparatus 2200. For example, a display 2228 may include or utilize a liquid crystal display (LCD), touchscreen LCD (e.g., capacitive display), light emitting diode (LED) display, projector, or other display device to present information to a user of the apparatus 2200 in a visual display.

One or more input devices 2230 (e.g., an alphanumeric keyboard, microphone, keypad, remote controller, game controller, camera, or camera array) may be connected to the bus 2214 via a user input port 2222 to communicate information and commands to the apparatus 2200. In selected embodiments, an input device 2230 may provide or support control over the positioning of a cursor. Such a cursor control device, also called a pointing device, may be configured as a mouse, a trackball, a track pad, touch screen, cursor direction keys or other device for receiving or tracking physical movement and translating the movement into electrical signals indicating cursor movement. The cursor control device may be incorporated into the display unit 2228, for example using a touch sensitive screen. A cursor control device may communicate direction information and command selections to the processor 2202 and control cursor movement on the display 2228. A cursor control device may have two or more degrees of freedom, for example allowing the device to specify cursor positions in a plane or three-dimensional space.

Some embodiments may be implemented in a non-transitory computer-readable storage medium for use by or in connection with the instruction execution system, apparatus, system, or machine. The computer-readable storage medium contains instructions for controlling a computer system to perform a method described by some embodiments. The computer system may include one or more computing devices. The instructions, when executed by one or more computer processors, may be configured or operable to perform that which is described in some embodiments.

As used in the description herein and throughout the claims that follow, "a," "an", and "the" includes plural references unless the context clearly dictates otherwise. Also, as used in the description herein and throughout the claims that follow, the meaning of "in" includes "in" and "on" unless the context clearly dictates otherwise.

The above description illustrates various embodiments along with examples of how aspects of some embodiments may be implemented. The above examples and embodiments should not be deemed to be the only embodiments and are presented to illustrate the flexibility and advantages of some embodiments as defined by the following claims. Based on the above disclosure and the following claims, other arrangements, embodiments, implementations, and equivalents may be employed without departing from the scope hereof as defined by the claims.

What is claimed is:

1. A method comprising:

generating a first representation of a first relationship between bitrate and quality based on first features of a first portion of a video;

analyzing the first representation to determine a first list of potential bitrates for the first portion of video;

analyzing potential bitrates and quality associated with the respective potential bitrates to refine the first list of potential bitrates to a second list of bitrates, wherein the second list of bitrates includes a different list of bitrates than the first list of potential bitrates, and wherein analyzing potential bitrates and quality associated with the respective potential bitrates to refine the first list of potential bitrates to the second list of bitrates comprises:

refining the first list of potential bitrates based on a quality associated with the potential bitrates to determine the second list of bitrates, wherein refining the first list of potential bitrates comprises:

adding a first potential bitrate to the list of potential bitrates; and outputting the second list of bitrates for encoding the first portion of video.

2. The method of claim 1, wherein generating the first representation comprises generating a first prediction of the first relationship for bitrate and quality.

3. The method of claim 1, wherein generating the first representation comprises:

inputting the first features into a prediction network; and generating a first prediction of the first representation based on the first features.

4. The method of claim 1, wherein refining the first list of potential bitrates comprises:

removing a first potential bitrate from the first list of potential bitrates.

5. The method of claim 4, wherein removing the first potential bitrate comprises:

determining a second potential bitrate;

comparing a first quality of the first potential bitrate to a second quality of the second potential bitrate; and determining whether to remove the first potential bitrate based on the comparing.

6. The method of claim 5, wherein the first potential bitrate is removed from the list of potential bitrates when a difference between the first quality and the second quality meets a threshold.

7. The method of claim 1, wherein adding the first potential bitrate comprises:

determining a second potential bitrate and a third potential bitrate that are in the first list of potential bitrates;

comparing a first quality of the second potential bitrate to a second quality of the third potential bitrate; and determining whether to add the first potential bitrate based on the comparing.

8. The method of claim 7, wherein the first potential bitrate is added when a difference between the first quality and the second quality meets a threshold.

9. The method of claim 1, wherein analyzing potential bitrates and quality associated with the respective potential bitrates to refine the first list of potential bitrates to the second list of bitrates comprises:

analyzing a plurality of first representations for a plurality of segments in the first portion of video;

determining a first minimum bitrate and a first maximum bitrate for each of the plurality of first representations; and determining a second minimum bitrate and a second maximum bitrate for the first portion of video based on the first minimum bitrate and the first maximum bitrate for each of the plurality of first representations.

10. The method of claim 9, wherein analyzing potential bitrates and quality associated with the respective potential bitrates to refine the first list of potential bitrates to the second list of bitrates comprises:

generating the first list of potential bitrates based on the second minimum bitrate and the second maximum bitrate, wherein potential bitrates in the first list of potential bitrates are analyzed to determine the second list of bitrates.

11. The method of claim 10, wherein analyzing potential bitrates and quality associated with the respective potential bitrates to refine the first list of potential bitrates to the second list of bitrates comprises:

determining potential removal candidate bitrates for each of the plurality of first representations, wherein a potential removal candidate bitrate is a potential removal from the first list of potential bitrates; and determining whether to remove a potential removal candidate bitrate based on the potential removal candidate bitrate being included as a potential removal candidate in one or more of each of the plurality of first representations.

12. The method of claim 10, wherein analyzing potential bitrates and quality associated with the respective potential bitrates to refine the first list of potential bitrates to the second list of bitrates comprises:

determining potential added candidate bitrates for each of the plurality of first representations, wherein a potential added candidate is a potential addition to the first list of potential bitrates; and determining whether to add a potential bitrate based on the potential added candidate bitrate being included as a potential added candidate in one or more of each of the plurality of first representations.

13. The method of claim 1, wherein:

the first list of potential bitrates includes a bitrate that is not included in the second list of bitrates.

14. The method of claim 1, further comprising:

encoding the first portion of video using the second list of bitrates to generate a plurality of first encoded portions for the first portion of video.

15. The method of claim 14, further comprising:

selecting an encoded segment from the plurality of first encoded portions for a first profile in a profile ladder; and selecting an encoded segment from the plurality of second encoded portions for the first profile in the profile ladder.

16. A method comprising:

generating a first representation of a first relationship between bitrate and quality based on first features of a first portion of a video;

analyzing the first representation to determine a first list of potential bitrates for the first portion of video;

analyzing potential bitrates and quality associated with the respective potential bitrates to refine the first list of potential bitrates to a second list of bitrates, wherein the second list of bitrates includes a different list of bitrates than the first list of potential bitrates;

outputting the second list of bitrates for encoding the first portion of video, generating a second representation of a second relationship between bitrate and quality based on second features of a second portion of the video;

analyzing the second representation to determine a third list of potential bitrates for the first portion of video;

analyzing potential bitrates and quality associated with the respective potential bitrates to refine the third list of potential bitrates to a fourth list of bitrates; and outputting the fourth list of bitrates for encoding the second portion of video, wherein the fourth list of bitrates is different from the second list of bitrates.

17. A non-transitory computer-readable storage medium having stored thereon computer executable instructions, which when executed by a computing device, cause the computing device to be operable for:

generating a first representation of a first relationship between bitrate and quality based on first features of a first portion of a video;

analyzing the first representation to determine a first list of potential bitrates for the first portion of video;

analyzing potential bitrates and quality associated with the respective potential bitrates to refine the first list of potential bitrates to a second list of bitrates, wherein the second list of bitrates includes a different list of bitrates than the first list of potential bitrates, and wherein analyzing potential bitrates and quality associated with the respective potential bitrates to refine the first list of potential bitrates to the second list of bitrates comprises:

refining the first list of potential bitrates based on a quality associated with the potential bitrates to determine the second list of bitrates, wherein refining the first list of potential bitrates comprises:

adding a first potential bitrate to the list of potential bitrates; and outputting the second list of bitrates for encoding the first portion of video.

18. The non-transitory computer-readable storage medium of claim 17, further operable for:

generating a second representation of a second relationship between bitrate and quality based on second features of a second portion of the video;

analyzing the second representation to determine a third list of potential bitrates for the first portion of video;

analyzing potential bitrates and quality associated with the respective potential bitrates to refine the third list of potential bitrates to a fourth list of bitrates; and outputting the fourth list of bitrates for encoding the second portion of video, wherein the fourth list of bitrates is different from the second list of bitrates.

19. An apparatus comprising:

one or more computer processors; and a computer-readable storage medium comprising instructions for controlling the one or more computer processors to be operable for:

generating a first representation of a first relationship between bitrate and quality based on first features of a first portion of a video;

analyzing the first representation to determine a first list of potential bitrates for the first portion of video;

analyzing potential bitrates and quality associated with the respective potential bitrates to refine the first list of potential bitrates to a second list of bitrates, wherein the second list of bitrates includes a different list of bitrates than the first list of potential bitrates, and wherein analyzing potential bitrates and quality associated with the respective potential bitrates to refine the first list of potential bitrates to the second list of bitrates comprises:

refining the first list of potential bitrates based on a quality associated with the potential bitrates to determine the second list of bitrates, wherein refining the first list of potential bitrates comprises:

adding a first potential bitrate to the list of potential bitrates; and outputting the second list of bitrates for encoding the first portion of video.

20. The apparatus of claim 19, further operable for:

generating a second representation of a second relationship between bitrate and quality based on second features of a second portion of the video;

analyzing the second representation to determine a third list of potential bitrates for the first portion of video;

analyzing potential bitrates and quality associated with the respective potential bitrates to refine the third list of potential bitrates to a fourth list of bitrates; and outputting the fourth list of bitrates for encoding the second portion of video, wherein the fourth list of bitrates is different from the second list of bitrates.

* * * * *